United States Patent
Kuma et al.

(10) Patent No.: US 11,310,518 B2
(45) Date of Patent: Apr. 19, 2022

(54) IMAGE PROCESSING APPARATUS AND METHOD

(71) Applicant: Sony Corporation, Tokyo (JP)

(72) Inventors: Satoru Kuma, Tokyo (JP); Ohji Nakagami, Tokyo (JP); Koji Yano, Tokyo (JP); Tsuyoshi Kato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/981,722

(22) PCT Filed: Mar. 28, 2019

(86) PCT No.: PCT/JP2019/013535
§ 371 (c)(1),
(2) Date: Sep. 17, 2020

(87) PCT Pub. No.: WO2019/198521
PCT Pub. Date: Oct. 17, 2019

(65) Prior Publication Data
US 2021/0250600 A1  Aug. 12, 2021

(30) Foreign Application Priority Data
Apr. 11, 2018 (JP) .............................. JP2018-076225

(51) Int. Cl.
*H04N 19/46* (2014.01)
*H04N 19/172* (2014.01)
(Continued)

(52) U.S. Cl.
CPC ............. *H04N 19/46* (2014.11); *G06T 3/005* (2013.01); *G06T 9/00* (2013.01); *H04N 19/172* (2014.11);
(Continued)

(58) Field of Classification Search
None
See application file for complete search history.

(56) References Cited

U.S. PATENT DOCUMENTS 10,123,706 B2 * 11/2018 Elbaz ................... A61B 5/0088
2018/0268570 A1 * 9/2018 Budagavi ................ G06T 9/001
(Continued)

FOREIGN PATENT DOCUMENTS

DE 102019117585 A1  2/2020
EP  3642800 A4 * 5/2020 ............. G06T 9/001
(Continued)

OTHER PUBLICATIONS

"PCC Test Model Category 2 v0", 120. MPEG Meeting; Oct. 23, 2017-Oct. 27, 2017; Macau; (Motion Picture Expert Group or ISO/IEC JTC1/SC29/WG11), No. n17248 Dec. 14, 2017 (Dec. 14, 2017), XP030023909,Retrieved from the Internet:URL:http://phenix.int-evry.fr/mpeg/doc end user/documents/120 Macau/wgll/w17248.zip w17248 TMC2v0-v2.docx[retrieved on Dec. 14, 2017] abstract; figures 2, 3 Sections 3, 4, 6.

(Continued)

*Primary Examiner* — Reza Aghevli
(74) *Attorney, Agent, or Firm* — Xsensus LLP

(57) ABSTRACT

An image processing apparatus and method that make it possible to decode encoded data of 3D data with increased ease. A bit stream is generated which includes projection direction information including information relating to a projection direction of position information of 3D data representative of a three-dimensional structure on a two-dimensional plane and encoded data of a geometry image obtained by projecting the position information on the two-dimensional plane.

9 Claims, 18 Drawing Sheets

(51) Int. Cl.
*H04N 19/174* (2014.01)
*H04N 19/184* (2014.01)
*G06T 3/00* (2006.01)
*G06T 9/00* (2006.01)

(52) U.S. Cl.
CPC ......... *H04N 19/174* (2014.11); *H04N 19/184* (2014.11)

(56) References Cited

U.S. PATENT DOCUMENTS

| | | | |
|---|---|---|---|
| 2019/0087979 A1* | 3/2019 | Mammou | G06T 9/001 |
| 2020/0228836 A1* | 7/2020 | Schwarz | G06T 15/04 |
| 2020/0351522 A1* | 11/2020 | Zhang | H04N 19/70 |
| 2021/0174559 A1* | 6/2021 | Nakagami | G06T 9/001 |

FOREIGN PATENT DOCUMENTS

| | | | |
|---|---|---|---|
| WO | 2019/055963 A1 | 3/2019 | |
| WO | WO-2019055963 A1 * | 3/2019 | H03M 7/30 |
| WO | WO-2020197086 A1 * | 10/2020 | H04N 19/70 |
| WO | WO-2020197228 A1 * | 10/2020 | H04N 19/124 |

OTHER PUBLICATIONS

Schwarz (Nokia) S et al:"Nokia's response to CfP for Point Cloud Compression (Category 2)", 120. MPEG Meeting; Oct. 23, 2017-Oct. 27, 2017; Macau; (Motion Picture Expert Group or ISO/I EC JTC1/SC29/WG11),No. m41779 Oct. 17, 2017 (Oct. 17, 2017), XP030070121,Retrieved from the Internet:URL:http://phenix.int-evry.fr/mpeg/doc end_user/documents/120_Macau/wgll/m41779-vl-m41779.zip m41779 PCC Nokia CfP response.doc [retrieved—on Oct. 17, 2017] abstract; figures 2, 5, 6 Sections 3.1.5 and 5.3.

International Search Report and Written Opinion dated May 21, 2019 for PCT/JP2019/013535 filed on Mar. 28, 2019, 9 pages including English Translation of the International Search Report.

Ochotta, T., Saupe, D., "Image-Based Surface Compression," Computer Graphics Forum, vol. 26, No. 6, 2008, pp. 1647-1663.

Preda, M., "Point Cloud Compression in MPEG," MP20 Workshop, Hong-Kong, Oct. 2017, 22 pages.

* cited by examiner

FIG. 3

| SETTING RELATING TO PROJECTION DIRECTION OF PATCH | | | | |
|---|---|---|---|---|
| PROJECTION DIRECTION | ANGLE (DIRECTION AND POSITION (DISTANCE)) | | | |
| | NEW PROJECTION DIRECTION (OTHER THAN CARTESIAN COORDINATE DIRECTION) | | | |
| PROJECTION DIRECTION INFORMATION | GENERATION AND TRANSMISSION OF PROJECTION DIRECTION INFORMATION | | | |
| | CORRESPONDENCE BETWEEN IDENTIFIER AND PROJECTION DIRECTION | | | |
| | ADDITIONAL INFORMATION | ATTRIBUTE INFORMATION RELATING TO DECODING | | |
| | | ATTRIBUTE INFORMATION | DECODING ORDER | |
| | | | MEANING INFORMATION (Face, etc.) | |
| ENCODING UNIT INFORMATION | GENERATION AND TRANSMISSION OF ENCODING UNIT INFORMATION | | | |
| | CORRESPONDENCE BETWEEN IDENTIFIER AND INTERSYMBOL UNIT | | | |
| | ADDITIONAL INFORMATION | ATTRIBUTE INFORMATION RELATING TO DECODING | | |
| | | ATTRIBUTE INFORMATION | MEANING INFORMATION (Face, etc.) | |
| ENCODING PROCESS | ASSOCIATION OF PROJECTION DIRECTION WITH EACH PATCH USING IDENTIFIER | | | |
| | OMISSION OF ENCODING OF PROJECTION DIRECTION THAT IS UNNECESSARY TO CREATE 2D IMAGE | | | |
| | PLACEMENT IN ENCODING UNIT CORRESPONDING TO PROJECTION DIRECTION | | | |
| | PRIORITIZATION OF DECODING ORDER OF DATA FOR DEFAULT View | | | |
| | QUALITY CONTROL ACCORDING TO DISPLAY FREQUENCY | | | |
| DECODING PROCESS | DECODING IN ORDER OF NEAREST TO View DIRECTION FROM PROJECTION DIRECTION | | | |
| | PARTIAL DECODING ACCORDING TO View DIRECTION | | | |
| | OMISSION OF DECODING OF PROJECTION DIRECTION OPPOSITE TO View DIRECTION | | | |

11

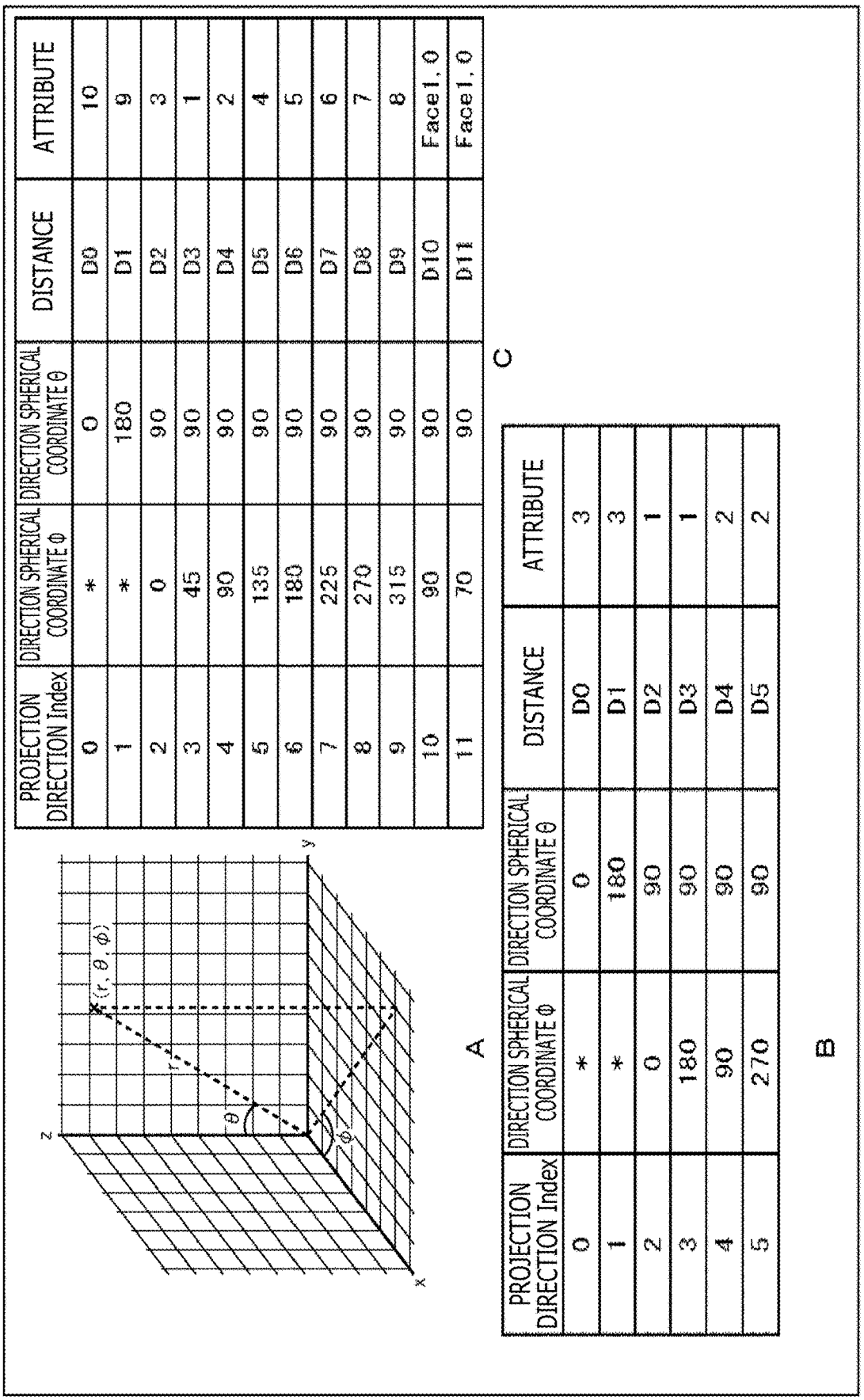

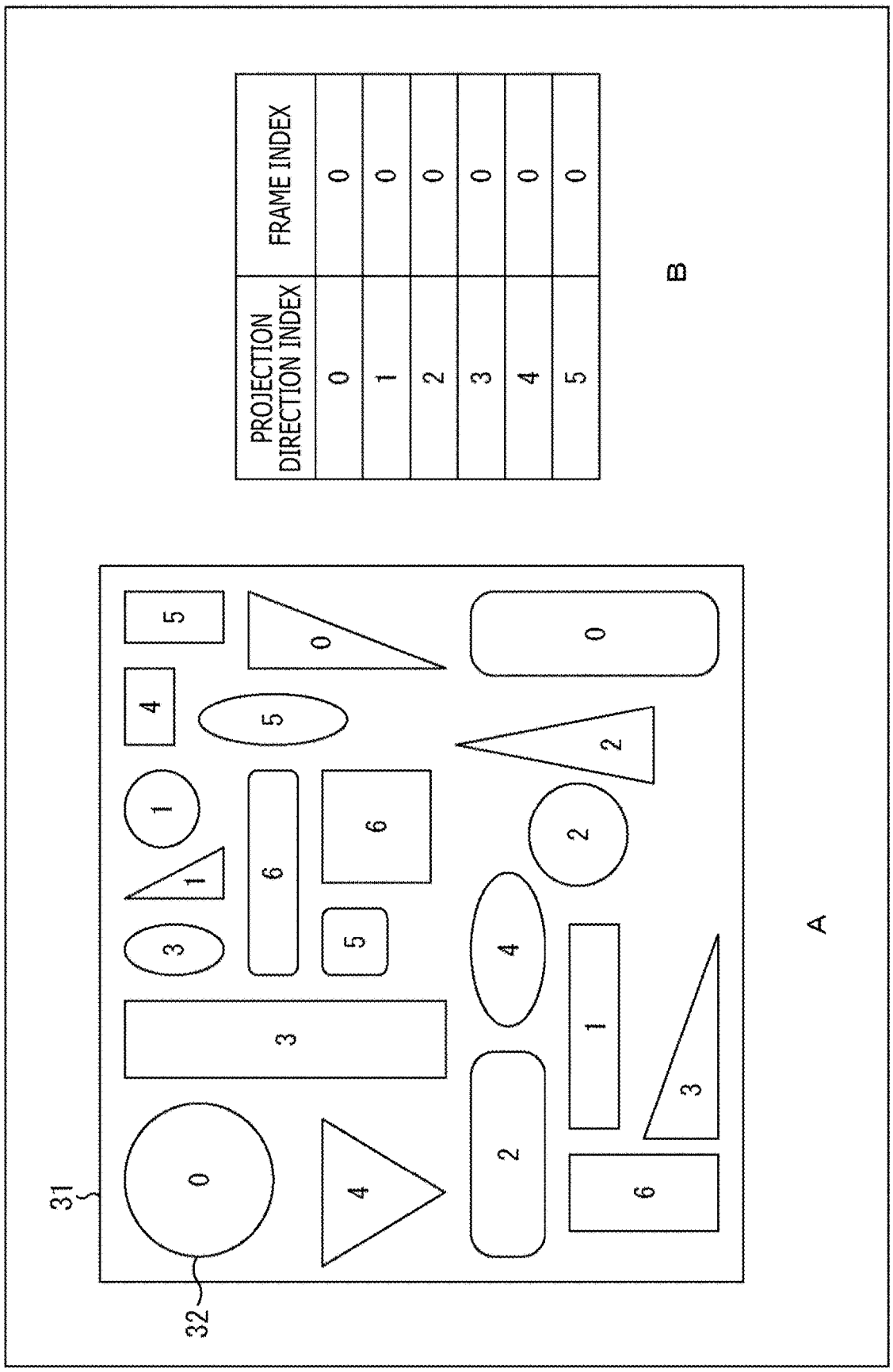

FIG. 6

| PROJECTION DIRECTION INDEX | FRAME INDEX | SLICE INDEX | TILE INDEX | ATTRIBUTE |
|---|---|---|---|---|
| 0 | 0 | 1 | - | |
| 1 | 0 | 2 | - | |
| 2 | 0 | 2 | - | |
| 3 | 0 | 3 | - | |
| 4 | 0 | 4 | - | |
| 5 | 0 | 5, 6 | - | |
| 6 | 0 | 0 | - | face |

IMAGE PROCESSING APPARATUS AND METHOD

CROSS-REFERENCE TO RELATED APPLICATIONS

The present application is based on PCT filing PCT/JP2019/013535, filed Mar. 28, 2019, which claims priority to JP 2018-076225, filed Apr. 11, 2018, the entire contents of each are incorporated herein by reference.

TECHNICAL FIELD

The present disclosure relates to an image processing apparatus and method, and particularly to an image processing apparatus and method that make it possible to decode encoded data of 3D data with increased ease.

BACKGROUND ART

Conventionally, as an encoding method for 3D data representative of a three-dimensional structure such as a point cloud, encoding that uses a voxel such as Octree is available (for example, refer to NPL 1)

In recent years, as another encoding method, for example, there has been proposed an approach in which position information and color information of a point cloud are individually projected on a two-dimensional plane for each small region and are encoded by an encoding method for a two-dimensional image (the approach is hereinafter also referred to as a video-based approach).

CITATION LIST

Non Patent Literature

[NPL 1]
R. Mekuria, Student Member IEEE, K. Blom, P. Cesar., Member, IEEE, "Design, Implementation and Evaluation of a Point Cloud Codec for Tele-Immersive Video," tcsvt_paper_submitted_february.pdf

SUMMARY

Technical Problem

However, such existing methods have many restrictions on a decoding order, a decoding range, and so forth, and there is the possibility that the existing methods may require such a complicated work that, in order to decode a desired portion of a decoding target, the entire decoding target must be decoded.

The present disclosure has been made in view of such a situation as described above and makes it possible to decode encoded data of 3D data with increased ease.

Solution to Problem

An image processing apparatus of one aspect of the present technology is an image processing apparatus including a bit stream generation section configured to generate a bit stream that includes projection direction information including information relating to a projection direction of position information of 3D data representative of a three-dimensional structure on a two-dimensional plane and encoded data of a geometry image obtained by projecting the position information on the two-dimensional plane.

An image processing method of the one aspect of the present technology is an image processing method including generating a bit stream that includes projection direction information including information relating to a projection direction of position information of 3D data representative of a three-dimensional structure on a two-dimensional plane and encoded data of a geometry image obtained by projecting the position information on the two-dimensional plane.

An image processing apparatus of another aspect of the present technology is an image processing apparatus including a decoding section configured to decode, on the basis of projection direction information including information relating to a projection direction of position information of 3D data representative of a three-dimensional structure on a two-dimensional plane, a bit stream that includes encoded data of a geometry image obtained by projecting the position information on the two-dimensional plane.

An image processing method of the another aspect of the present technology is an image processing method including decoding, on the basis of projection direction information including information relating to a projection direction of position information of 3D data representative of a three-dimensional structure on a two-dimensional plane, a bit stream that includes encoded data of a geometry image obtained by projecting the position information on the two-dimensional plane.

An image processing apparatus of a further aspect of the present technology is an image processing apparatus including a packing section configured to place and pack a geometry image that is obtained by projecting position information of 3D data representative of a three-dimensional structure on a two-dimensional plane, in an encoding unit of an image according to a projection direction of the position information on the two-dimensional plane.

An image processing method of the further aspect of the present technology is an image processing method including placing and packing a geometry image that is obtained by projecting position information of 3D data representative of a three-dimensional structure on a two-dimensional plane, in an encoding unit of an image according to a projection direction of the position information on the two-dimensional plane.

An image processing apparatus of a still further aspect of the present technology is an image processing apparatus including a decoding section configured to decode, from an encoding unit of a bit stream according to a projection direction of position information of 3D data representative of a three-dimensional structure on a two-dimensional plane, a geometry image projected on the two-dimensional plane in the projection direction.

An image processing method of the still further aspect of the present technology is an image processing method including decoding, from an encoding unit of a bit stream according to a projection direction of position information of 3D data representative of a three-dimensional structure on a two-dimensional plane, a geometry image projected on the two-dimensional plane in the projection direction.

In the image processing apparatus and method of the one aspect of the present technology, a bit stream is generated which includes projection direction information including information relating to a projection direction of position information of 3D data representative of a three-dimensional structure on a two-dimensional plane and encoded data of a geometry image obtained by projecting the position information on the two-dimensional plane.

In the image processing apparatus and method of the another aspect of the present technology, on the basis of projection direction information including information relating to a projection direction of position information of 3D data representative of a three-dimensional structure on a two-dimensional plane, a bit stream is decoded which includes encoded data of a geometry image obtained by projecting the position information on the two-dimensional plane.

In the image processing apparatus and method of the further aspect of the present technology, a geometry image that is obtained by projecting position information of 3D data representative of a three-dimensional structure on a two-dimensional plane is placed and packed in an encoding unit of an image according to a projection direction of the position information on the two-dimensional plane.

In the image processing apparatus and method of the still further aspect of the present technology, from an encoding unit of a bit stream according to a projection direction of position information of 3D data representative of a three-dimensional structure on a two-dimensional plane, a geometry image projected on the two-dimensional plane in the projection direction is decoded.

Advantageous Effect of Invention

With the present disclosure, an image can be processed. Especially, encoded data of 3D data can be decoded with increased ease.

BRIEF DESCRIPTION OF DRAWINGS

FIG. 3 is a diagram in which principal features relating to the present technology are summarized.
FIG. 4 illustrates diagrams of projection direction information.
FIG. 5 illustrates diagrams of an example of a state of packing.
FIG. 6 is a diagram illustrating encoding unit information.

DESCRIPTION OF EMBODIMENT

In the following, a mode for carrying out the present disclosure (hereinafter referred to as an embodiment) is described. It is to be noted that the description is given in the following order.

1. Video-Based Approach
2. First Embodiment (Control for Each Projection Direction)
3. Appendices
1. Video-Based Approach <Document and so Forth for Supporting Technical Contents and Technical Terms>

The scope disclosed in the present technology includes not only contents described in the description of the embodiment but also contents described in the following pieces of NPL that were publicly known at the time of application.

NPL 1: (specified hereinabove)
NPL 2: TELECOMMUNICATION STANDARDIZATION SECTOR OF ITU (International Telecommunication Union), "Advanced video coding for generic audiovisual services," H.264, April 2017
NPL 3: TELECOMMUNICATION STANDARDIZATION SECTOR OF ITU (International Telecommunication Union), "High efficiency video coding," H.265, December 2016
NPL 4: Jianle Chen, Elena Alshina, Gary J. Sullivan, Jens-Rainer, Jill Boyce, "Algorithm Description of Joint Exploration Test Model 4," JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

In other words, contents described in the pieces of NPL specified above are also grounds when the requirement of support in the description is decided. For example, even in the case where the Quad-Tree Block Structure described in NPL 3 and the QTBT (Quad Tree Plus Binary Tree) Block Structure described in NPL 4 are not described directly in the embodiment, they fall within the scope of the disclosure of the present technology, and the requirement of support in claims is satisfied. Further, in regard to technical terms such as parsing, syntax, and semantics, even in the case where there is no direct description in the description of the embodiment, they are also within the scope of the disclosure of the present technology, and the requirement of support in the claims is satisfied, similarly.

<Point Cloud>

Conventionally, there are pieces of data such as a point cloud that represents a three-dimensional structure by position information, attribute information, and so forth of a group of points or a mesh that includes vertices, edges, and faces and defines a three-dimensional shape using a polygonal representation.

Figure 1:
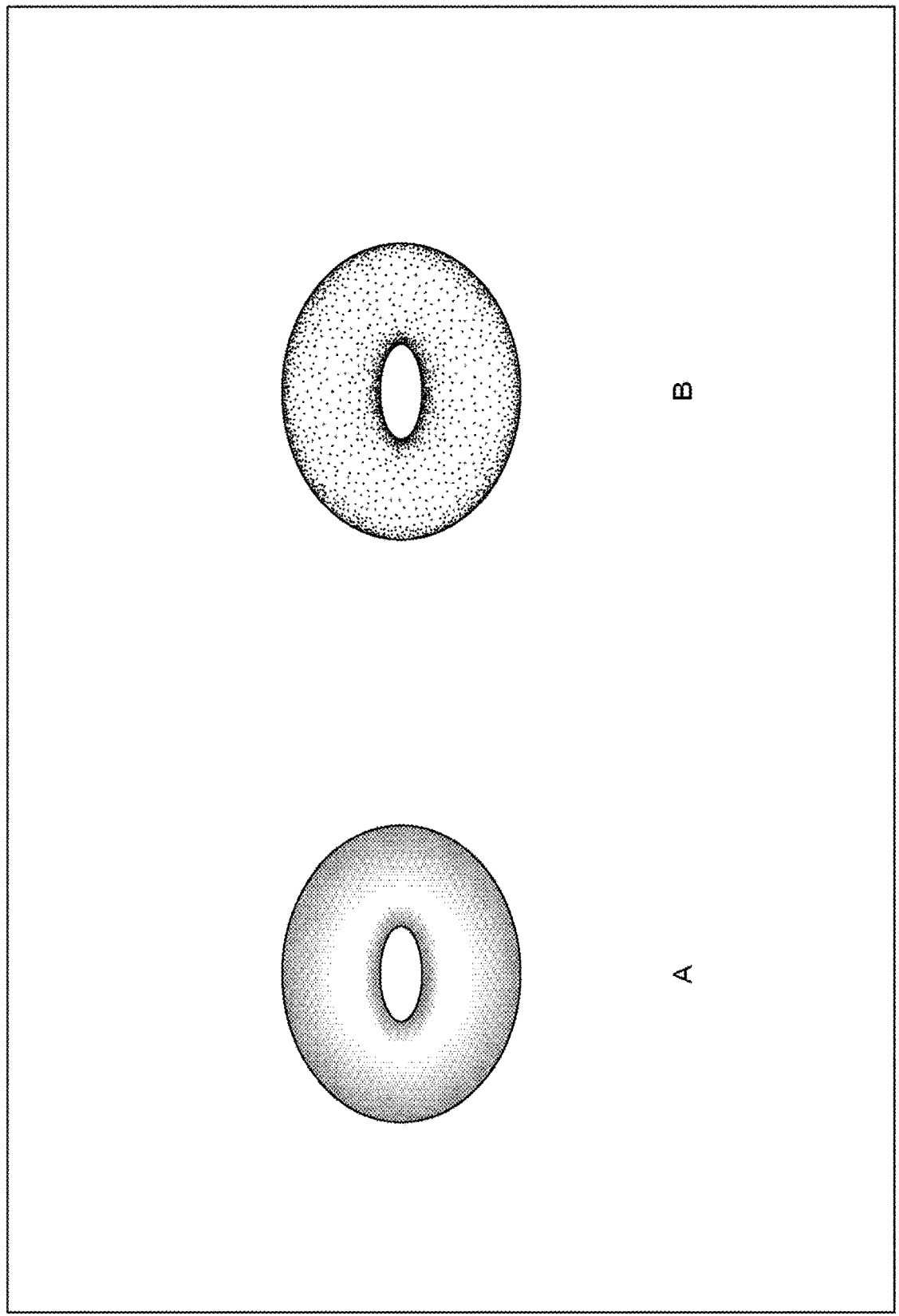
FIG. 1 illustrates diagrams of an example of a point cloud.

For example, in the case of the point cloud, such a three-dimensional structure as depicted in A of FIG. 1 is represented as such an aggregation of a great number of points (group of points) as depicted in B of FIG. 1. In particular, data of the point cloud includes position information and attribute information (for example, a color and so forth) of each point included in the group of points. Accordingly, the data structure is comparatively simple, and any solid structure can be represented with sufficient accuracy by using a sufficiently great number of points.

<Outline of Video-Based Approach>

There has been proposed a video-based approach in which position information and color information of such a point cloud as described above are individually projected on a two-dimensional plane for each small region and are encoded by an encoding method for a two-dimensional image.

Figure 2:
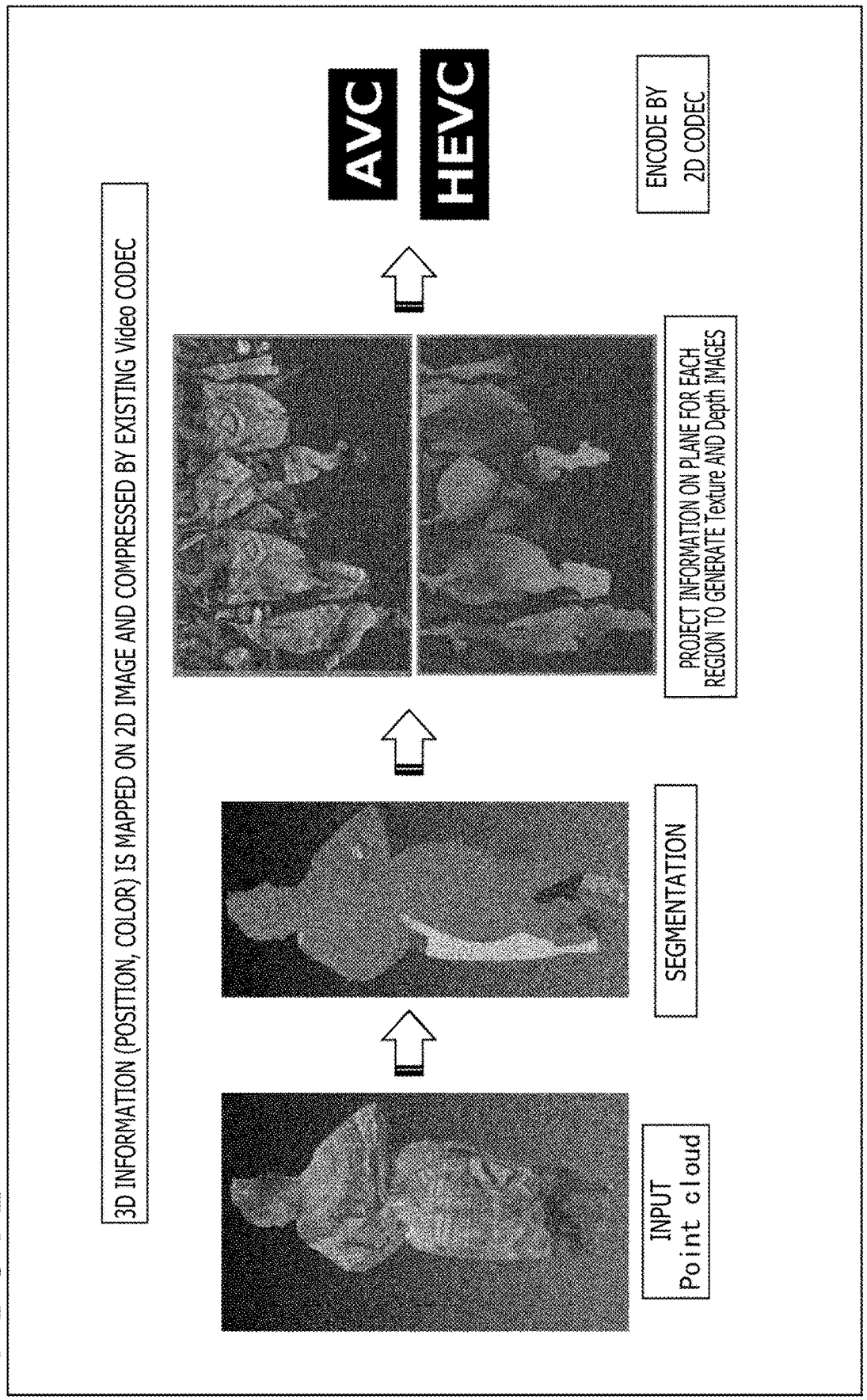
FIG. 2 is a diagram illustrating an example of an outline of a video-based approach.

In the video-based approach, for example, as depicted in FIG. 2, an inputted point cloud is divided into a plurality of segmentations (also referred to as regions) and is projected on a two-dimensional plane for each region. It is to be noted that data for each position of the point cloud (namely, data of each point) includes position information (Geometry (also referred to as Depth)) and attribute information (Texture) as described above, and each pieces of information is projected on a two-dimensional plane for each region.

Then, each segmentation (also referred to as a patch) projected on the two-dimensional plane is placed on a two-dimensional image and then is encoded by an encoding method for a two-dimensional plane image such as AVC (Advanced Video Coding) or HEVC (High Efficiency Video Coding).

However, such existing methods have many restrictions on a decoding order, a decoding range, and so forth, and there is the possibility that the existing methods may require such a complicated work that, in order to decode a desired portion of a decoding target, the entire decoding target must be decoded.

For example, in the case of the related art, all patches are placed in a frame image without taking the decoding order and so forth into consideration, and encoding units are not independent of each other among the patches. Therefore, in order to decode part of the patches, it is necessary to decode all patches (partial decoding is difficult).

Further, in the case of the related art, projection is performed in directions orthogonal to each other (0 degrees, 90 degrees, 180 degrees, and 270 degrees) each as a reference direction for projection on a 2D plane. In such a case, since projection by 45 degrees in the maximum is performed, there is the possibility that occurrence of occlusion may increase and the reproducibility may decrease.

Furthermore, for example, in order to keep patches within a bit depth of an image having a wide range in depth (decreasing in Video Codec compression efficiency), the patch decomposition increases, resulting in the possibility that the processing amount for smoothing may increase.

<Transmission of Projection Direction Information>

Therefore, there is generated a bit stream which includes projection direction information that is information relating to a projection direction of position information of 3D data, which represents a three-dimensional structure, on a two-dimensional plane and encoded data of a geometry image obtained by projecting the position information on the two-dimensional plane.

For example, an image processing apparatus includes a bit stream generation section configured to generate a bit stream including projection direction information that is information relating to a projection direction of position information of 3D data, which represents a three-dimensional structure, on a two-dimensional plane and encoded data of a geometry image obtained by projecting the position information on the two-dimensional plane.

Since this makes it possible to set a projection direction as desired, it is possible to generate and encode a patch with a more appropriate projection direction, for example, according to a View direction or the like. This makes it possible for the decoding side to decode encoded data of 3D data with increased ease. For example, it is possible to suppress occurrence of occlusion and suppress increase of the number of patches, and it is also possible to suppress increase of the load of decoding processing (for example, the processing amount, the processing time, the data amount to be processed, and so forth).

Further, on the basis of projection direction information that is information relating to a projection direction of position information of 3D data, which represents a three-dimensional structure, on a two-dimensional plane, a bit stream including encoded data of a geometry image obtained by projecting the position information on the two-dimensional plane is decoded.

For example, an image processing apparatus includes a decoding section that decodes, on the basis of projection direction information that is information relating to a projection direction of position information of 3D data, which represents a three-dimensional structure, on a two-dimensional plane, a bit stream including encoded data of a geometry image obtained by projecting the position information on the two-dimensional plane.

This makes it possible to grasp a projection direction of a patch set as desired with increased ease. Therefore, in various decoding methods such as a decoding method by which a patch with a more appropriate projection direction is selected and decoded, for example, according to a View direction or the like, encoded data of 3D data can also be decoded with increased ease. Therefore, it is possible to suppress increase of the load of decoding processing (for example, the processing amount, the processing time, the data amount to be processed, and so forth).

<Placement Control of Patch>

Further, a geometry image obtained by projecting position information of 3D data representative of a three-dimensional structure on a two-dimensional plane is placed and packed in an encoding unit of the image according to a projection direction of the position information on the two-dimensional plane.

For example, an image processing apparatus includes a packing section that places and packs a geometry image, which is obtained by projecting position information of 3D data representative of a three-dimensional structure on a two-dimensional plane, in an encoding unit of the image according to a projection direction of the position information on the two-dimensional plane.

This makes it possible to control, upon decoding, the decoding order of patches or implement partial decoding of decoding only part of patches easily. In particular, it becomes possible for the decoding side to decode encoded data of 3D data with increased ease, and it is possible to suppress increase of the load of decoding processing (for example, the processing amount, the processing time, the data amount to be processed, and so forth).

Further, from an encoding unit of a bit stream according to a projection direction of position information of 3D data, which represents a three-dimensional structure, on a two-dimensional plane, a geometry image projected on the two-dimensional plane in the projection direction is decoded.

For example, an image processing apparatus includes a decoding section that decodes, from an encoding unit of a bit stream according to a projection direction of position information of 3D data, which represents a three-dimensional structure, on a two-dimensional plane, a geometry image projected on the two-dimensional plane in the projection direction.

This makes it possible to control the decoding order of patches easily and implement partial decoding in which only part of patches are decoded. In other words, it becomes possible to decode encoded data of 3D data with increased ease, and it is possible to suppress increase of the load of decoding processing (for example, the processing amount, the processing time, the data amount to be processed, and so forth).

<Present Technology Relating to Video-Based Approach>

The present technology relating to such a video-based approach as described above is described. In the present technology, setting relating to a projection direction is performed for a patch as indicated by a table of FIG. 3.

<Projection Direction>

The projection direction indicates an angle of projection of 3D data (for example, a point cloud or the like) on a two-dimensional plane in the video-based approach, that is, a direction and a position (distance) of the two-dimensional plane as viewed from the 3D data. For example, the projection direction (direction and position) may be represented using spherical coordinates (r, θ, ϕ) as depicted in A of FIG. 4.

The projection direction may include directions orthogonal to each other (0 degrees, 90 degrees, 180 degrees, and 270 degrees), which are same as those in the related art, or may include a new direction and position in addition to such Cartesian coordinate directions. In the case of the related art, the projection direction includes only the Cartesian coordinate directions as indicated in a table of B of FIG. 4 and is determined in advance (incapable of setting). By performing setting relating to the projection direction on a patch in such a manner as described above, a projection direction other than the Cartesian coordinate directions can also be set as depicted, for example, in a table of C of FIG. 4.

<Projection Direction Information>

As the setting relating to the projection direction, for example, projection direction information that is information relating to the projection direction is generated and transmitted. The projection direction information is information indicative of a correspondence between an identifier and a projection direction. In other words, the projection direction information is information that allocates an identifier to a projection direction to be set. An example of the projection direction information is depicted in C of FIG. 4. In the projection direction information depicted in C of FIG. 4, a projection direction (direction spherical coordinate ϕ, direction spherical coordinate θ, distance r) is associated with an identifier of each projection direction (projection direction index). It is to be noted that projection directions identical to each other may be associated with a plurality of identifiers.

By generating and transmitting such projection direction information as described above, each patch and a projection direction can be associated with each other using the identifier. Accordingly, increase of the code amount can be suppressed. In addition, on the decoding side, the projection direction of each patch can also be grasped easily on the basis of the projection direction information. Accordingly, increase of the load of decoding processing can be suppressed, and encoded data of 3D data can be decoded with increased ease.

Further, since generation and transmission of such projection direction information as described above make it possible to set any projection direction, it is possible to set a projection direction so as to suppress occurrence of occlusion, for example, by setting a direction and a position that are likely to become a View direction as a projection direction or excluding a direction and a position that are unlikely to become a View direction from a projection direction, and therefore, reduction of the reproducibility can be suppressed. Further, since it is also possible to set the projection direction so as to suppress increase of patch decomposition, increase of the smoothing processing amount can be suppressed.

<Additional Information>

It is to be noted that attribute information relating to decoding may be added as additional information to the projection direction information. The content of the attribute information is determined as desired. Further, the number of pieces of the attribute information to be added is determined as desired.

For example, as the attribute information, a decoding order (order of priority of decoding) may be set for each projection direction. In the case of the projection direction information depicted in C of FIG. 4, as the "attribute," a number indicative of a decoding order (order of priority of decoding) is allocated to the identifier of each projection direction (projection direction index). It is to be noted that numbers indicative of decoding orders identical to each other may be allocated to a plurality of identifiers.

By controlling the decoding order of each patch with such information as described above, more various decoding methods can be implemented. For example, a projection direction having greater importance can be decoded with higher priority. Further, it is possible to realize such a decoding method that, for example, by referencing the decoding order, a patch with a projection direction nearer to a requested View direction is decoded preferentially. This makes it possible to decode (display) an image with the requested View direction earlier. Further, it is also possible to realize such a decoding method that decoding of a patch with a projection direction that is less important is omitted according to a load situation or the like, for example.

Further, as the attribute information, meaning information indicative of a characteristic (meaning) of a three-dimensional structure may be included. For example, a projection direction for projecting a location having a predetermined meaning in a three-dimensional structure may be set, and meaning information indicative of the meaning may be associated with the projection direction and added as attribute information. For example, a dedicated projection direction may be set to project the "face" of a person, and meaning information such as "Face" may be added to the projection direction.

This makes it possible to select, in decoding, the projection direction according to the meaning information. For example, in the case where the "face" is to be decoded, only by designating the meaning information "Face" in place of designating the projection direction, it is possible to decode a necessary patch easily and restore (display) an image of the "face."

In the case of the example of C of FIG. 4, meaning information "Face 1" is added to the projection directions having projection direction indices of "10" and "11." In such a case, by decoding patches with the projection directions, patches relating to "Face 1" can be decoded. It is to be noted that a plurality of pieces of attribute information may be added to one projection direction index. Further, a plurality of pieces of meaning information may be added to one projection direction index.

<Encoding Unit Information>

As a setting relating to a projection direction, encoding unit information that is information relating to an encoding unit for placement of a patch is generated, for example, for each projection direction and is transmitted. The encoding unit information is information indicative of a correspondence between an identifier of a projection direction described above and an encoding unit for placement of a patch projected in the projection direction. In other words, the encoding unit information is information indicative of a correspondence between each projection direction and an encoding unit to be used.

The encoding unit is a data unit that can be encoded and decoded independently. Although a particular data unit of the encoding unit is not restricted specifically, for example, it may be a slice, a tile, a picture, or the like.

An example of placement of patches in the case of the related art is depicted in A of FIG. 5. In A of FIG. 5, a plurality of patches 32 is placed on a picture 31. Although, in A of FIG. 5, a reference sign is given to only one patch, each of figures in the picture 31 is the patch 32. A numeral indicated in each patch 32 denotes a projection direction (namely, a projection direction index). In the case of the related art, each patch 32 is placed on the picture 31 without taking the decoding order and so forth into consideration as depicted in A of FIG. 5. Accordingly, as indicated in a table depicted in B of FIG. 5, frames identical to each other (frame index "0") are allocated to the respective projection direction indices (in other words, incapable of setting).

By use of such encoding unit information as described above, it is possible to set, for each projection direction, an encoding unit (frame, slice, tile, or the like) for the placement of a patch as indicated, for example, in a table of FIG. 6. In the case of the example of FIG. 6, a frame index for the identification of a frame, a slice index for the identification of a slice, and a tile index for the identification of a tile are associated with each projection direction index.

For example, in the case of the table of FIG. 6, the patch having the projection direction index "0" is placed on the slice index "1" of the frame index "0." Meanwhile, the patch having the projection direction index "6" is placed on the slice index "0" of the frame index "0."

It is to be noted that a plurality of encoding units may be allocated to one projection direction such as the projection index "5" described in the table of FIG. 6, or a plurality of projection directions may be allocated to encoding units identical to each other such as the projection indices "1" and "2."

Figure 7:
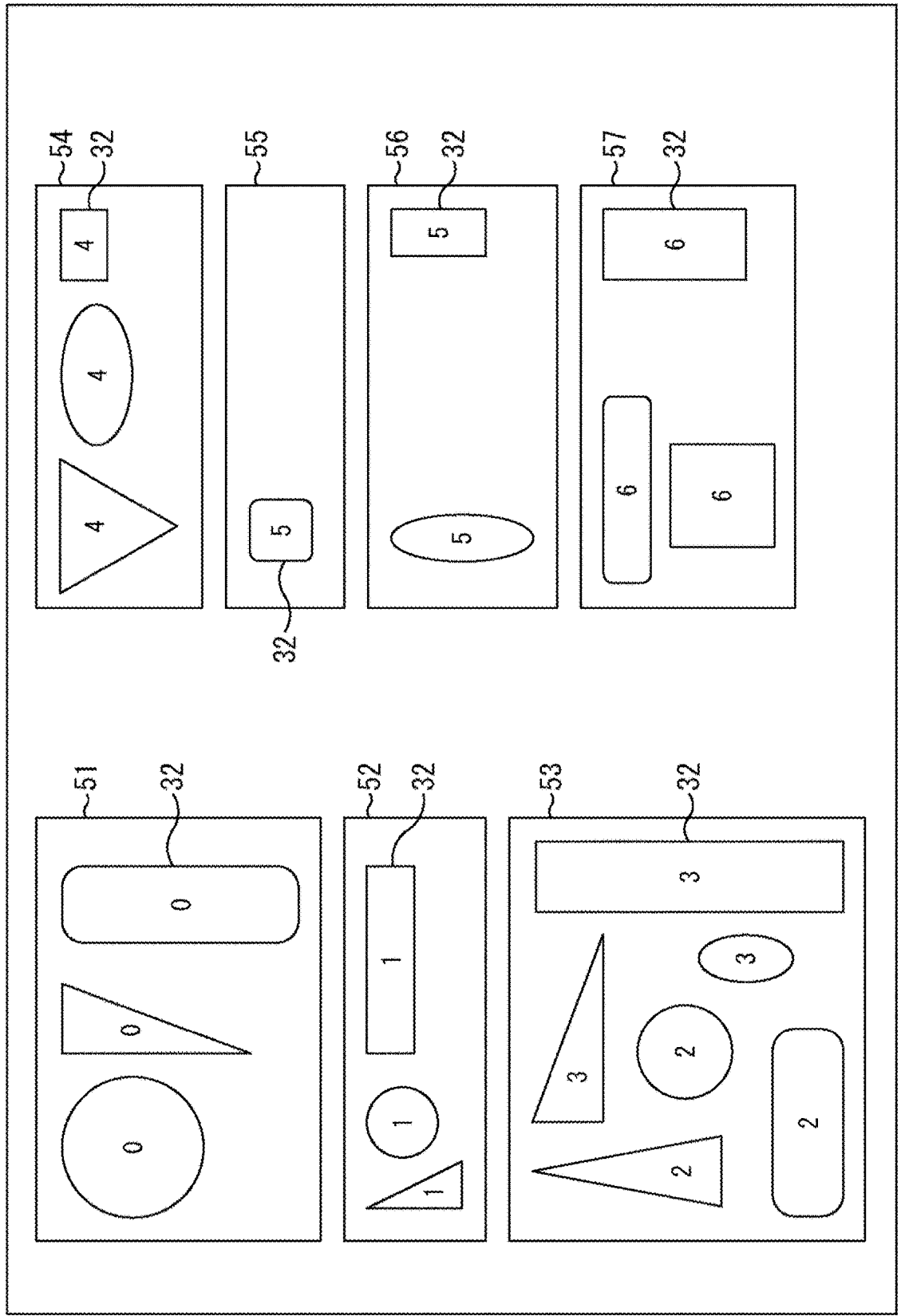
FIG. 7 is a diagram illustrating an example of a state of packing.

By placing the patches according to the encoding unit information, each of the patches can be placed in the encoding unit according to the projection direction. For example, as depicted in FIG. 7, the respective patches 32 in A of FIG. 5 can be classified into slices 51 to 57 for each of the projection indices and placed.

This makes it possible to omit decoding of, for example, patches with unnecessary projection directions (that is, to decode only part of patches) (to implement partial decoding). It is also possible to preferentially decode an important patch (to control the decoding order of patches). In other words, it becomes possible to decode encoded data of 3D data with increase ease, and increase of the load of the decoding process (for example, the processing amount, processing time, data amount to be processes, and so forth) can be suppressed. In the case where various decoding methods are implemented, necessary part of data can be decoded, and therefore, increase of the load of the decoding process can also be suppressed.

It is to be noted that, although, in the example of FIG. 6, placement control of patches is performed using a slice, a tile may be used in place of the slice to perform placement control. Further, both the slice and the tile may be used to perform placement control. Needless to say, encoding units in such patch placement control as just described may be hierarchized. In other words, placement control of a plurality of hierarchies, for example, may be performed similarly to frames and slices. For example, in the example of FIG. 6, a patch may be placed to frames having frame indices other than "0."

It is to be noted that attribute information relating to decoding may be added to the encoding unit information as additional information. The content of the attribute information is determined as desired. For example, as the attribute information, the encoding unit information may include meaning information indicative of a characteristic (meaning) of a three-dimensional structure (for example, "Face" or the like). In such a way, the meaning information makes it possible to select an encoding unit to be decoded.

<Encoding Process>

In an encoding process of 3D data, an identifier of a projection direction described hereinabove is used to associate each patch with a projection direction. In other words, an identifier of a projection direction is allocated to each patch. This makes it possible to associate various kinds of information such as a projection direction, attribute information, and an encoding unit with each patch.

It is to be noted that, at the time of such encoding, encoding of a patch with a projection direction that is unnecessary to create a 2D image (decoding) may be omitted. For example, in the case of a person, there is a strong possibility that a patch with such a projection direction that projects the sole may not be decoded. Therefore, by omitting encoding of a patch with such a projection direction as just described, it is possible to suppress increase of the code amount and suppress reduction of the encoding efficiency.

It is determined which projection direction is unnecessary depending upon the three-dimensional structure, the situation, and so forth. Accordingly, the setting method of the unnecessary projection direction is determined as desired. For example, the unnecessary projection direction may be set on the basis of any information or the like.

Further, in the encoding process of 3D data, a patch is placed on an image and packed, and in such packing, each patch is placed in an encoding unit associated with the projection direction of the patch. For example, in the case where such encoding unit information as described above is set, placement of the patches is performed according to the encoding unit information. Since this makes it possible to control the encoding unit for placement for each projection direction, encoded data of 3D data can be decoded with increased ease.

Further, in the encoding process of 3D data, for example, in the case of setting priorities over the decoding orders of the respective patches as described above, the decoding order of data (patch) for a default View direction that is an initial value of the View direction that is set in the case where a user does not designate a View direction to be displayed may be prioritized. This makes it possible to restore (display) an image with the default View direction in an earlier stage.

Further, in the encoding process of 3D data, when a packed patch is encoded, the quality setting for the encoding may be controlled according to the display frequency of the patch. As described hereinabove, the respective patches are placed in encoding units controlled for individual projection directions. Since the encoding units can be encoded and decoded independently of each other, it is also possible to control the quality for each encoding unit. In other words, the quality of a patch can be controlled according to the projection direction of the patch. In the case where there is a deviation in the View direction to be displayed, for example, the display frequency of a patch that is used for generating an image with a View direction that is displayed frequently becomes higher, and thus the patch display frequency of a patch is deviated. Needless to say, subjective image quality with respect to the code amount is enhanced by improving the picture quality of a patch having a high display frequency instead of improving the picture quality of a patch having a low display frequency. In other words, by performing quality setting of encoding according to such a deviation as described above, reduction of the encoding efficiency can be suppressed.

<Decoding Process>

In a decoding process of 3D data, it is possible to control the decoding method on the basis of the projection direction information and the encoding unit information described above, and so forth. For example, decoding may be performed in an order of nearest to a designated View direction from a position direction. Since the projection direction of each patch can be grasped with increased ease by referring to the projection direction information, such decoding control as described above can be implemented with increased ease.

Further, partial decoding (partial decode) may be performed, for example, according to the View direction. Since the encoding unit for placement of each patch is controlled for each projection direction, part of patches can be decoded on the basis of the projection direction (partial decoding can be implemented). Further, by referring to the encoding unit information, it is possible to grasp the encoding unit in which a patch with a desired projection direction is to be placed with increased ease. Furthermore, by referring to the projection direction information, the projection direction of each patch can be grasped with increased ease. Accordingly, such decoding control as described above can be implemented with increased ease.

For example, decoding of a patch with a projection direction opposite to the View direction may be omitted. Generally, a patch with an opposite direction to the View direction does not contribute to generation of an image with the View direction. Accordingly, by omitting decoding of a patch with a projection direction opposite to the View direction by partial decoding (partial decode) according to the View direction described above, decoding of unnecessary information can be omitted. In other words, increase of the load of decoding can be suppressed.

Figure 8:
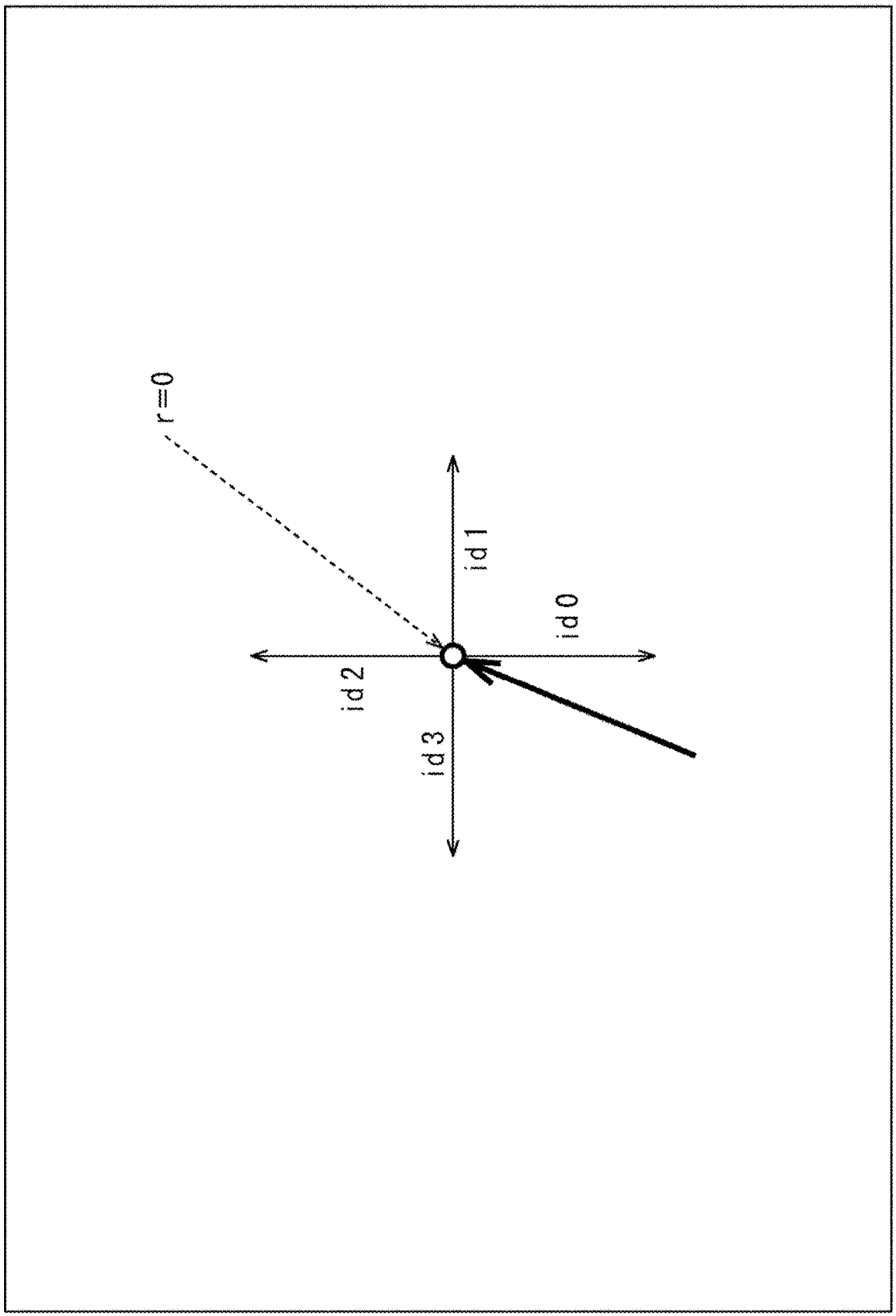
FIG. 8 is a diagram illustrating a View direction and a decoding order.

For example, it is assumed that a View direction is set as indicated by a thick line arrow with respect to four projection directions of id 0 to id 3 as depicted in FIG. 8. The decoding order of patches in each projection direction may be, for example, an ascending order of the value of the inner product of each projection direction and the View direction. In such a case, the patches are decoded in the order of id 0, id 3, id 1, and id 2. Alternatively, the decoding order of patches with the respective projection directions may be, for example, any of the following order.

1. The patches are decoded in an ascending order of the absolute value of the inner product that is in the negative.
2. The patches whose inner product is 0 are decoded.
3. The patches are decoded in an ascending order of the absolute value of the inner product that is in the positive.

In such a case, the patches are decoded in the order of id 3, id 0, id 1, and id 2.

As an alternative, in the case where the inner product is in the negative, the patches may be decoded in the ascending order of the inner product, whereas, in the case where the inner product is not in the negative, the patches may not be decoded. In such a case, the patches are decoded in the order of id 0 and id 3.

As another alternative, only patches that include the face, that is, patches that are associated with the attribute information "Face," may be decoded.

it is to be noted that 3D data for generating patches described above may be position information (Geometry) indicative of the position of each point or may be attribute information (Texture) such as color information added to such position information.

2. First Embodiment

<Encoding Apparatus>

Figure 9:
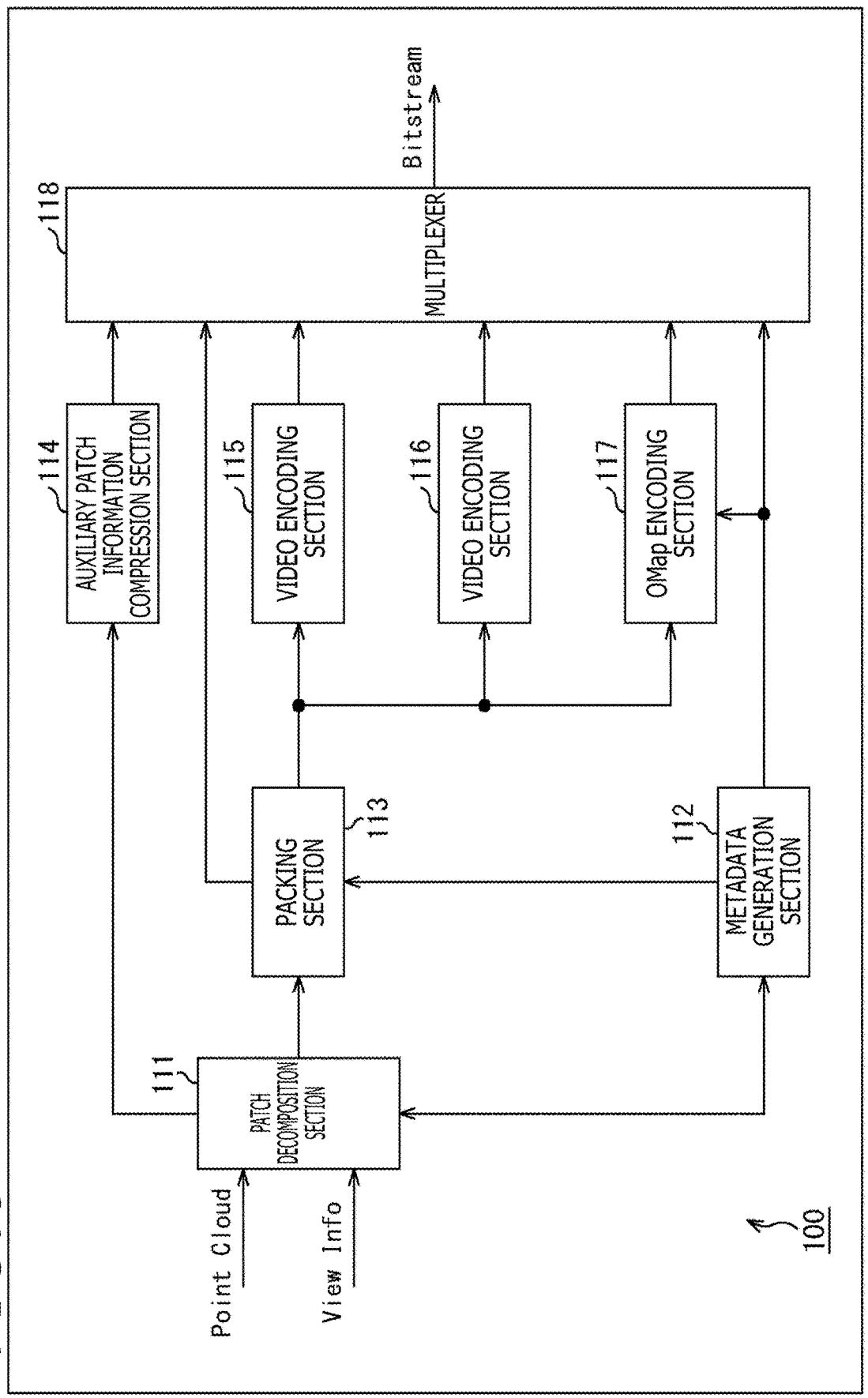
FIG. 9 is a block diagram depicting an example of principal components of an encoding apparatus.

Now, a configuration for implementing such various techniques as described above is described. FIG. 9 is a block diagram depicting an example of a configuration of an encoding apparatus that is one mode of an image processing apparatus to which the present technology is applied. An encoding apparatus 100 depicted in FIG. 9 is an apparatus that projects 3D data such as a point cloud on a two-dimensional plane to perform encoding by an encoding method for a two-dimensional image (encoding apparatus to which the video-based approach is applied).

It is to be noted that FIG. 9 depicts principal ones of processing sections, data flows, and so forth, and not all of such processing sections and data flows are depicted in FIG. 9. In other words, the encoding apparatus 100 may include any processing section that is not depicted as a block in FIG. 9 or may include any process or any data flow that is not depicted as an arrow or the like in FIG. 9. This is similarly applied to the other figures that illustrates processing sections and so forth in the encoding apparatus 100.

As depicted in FIG. 9, the encoding apparatus 100 includes a patch decomposition section 111, a metadata generation section 112, a packing section 113, an auxiliary patch information compression section 114, a video encoding section 115, a video encoding section 116, an OMap encoding section 117, and a multiplexer 118.

The patch decomposition section 111 performs a process relating to decomposition of 3D data. For example, the patch decomposition section 111 acquires 3D data (for example, a point cloud) and information relating to a View direction (View Info) inputted to the encoding apparatus 100 and representative of a three-dimensional structure. Further, the patch decomposition section 111 decomposes the acquired 3D data into a plurality of segmentations and projects the 3D data on a two-dimensional plane for each of the segmentations to generate patches. Thereupon, the patch decomposition section 111 acquires projection direction information from the metadata generation section 112 and allocates an identifier (projection direction index) to each patch on the basis of the acquired information.

The patch decomposition section 111 supplies information relating to each of the generated patches to the packing section 113. Further, the patch decomposition section 111 supplies auxiliary patch information that is information relating to the decomposition to the auxiliary patch information compression section 114. Furthermore, the patch decomposition section 111 supplies information relating to a projection direction and so forth when a patch is generated to the metadata generation section 112.

The metadata generation section 112 performs a process relating to generation of metadata. For example, the metadata generation section 112 acquires information relating to a projection direction and so forth supplied from the patch decomposition section 111. The metadata generation section 112 generates projection direction information and encoding unit information on the basis of the acquired information.

The metadata generation section 112 supplies the generated projection direction information, for example, to the patch decomposition section 111, packing section 113, video encoding section 115, video encoding section 116, OMap encoding section 117, and multiplexer 118. Further, the metadata generation section 112 supplies the generated encoding unit information, for example, to the packing section 113, video encoding section 115, video encoding section 116, OMap encoding section 117, and multiplexer 118.

The packing section 113 performs a process relating to packing of data. For example, the packing section 113 acquires data (patches) of a two-dimensional plane on which 3D data is projected for each region supplied from the patch decomposition section 111. Further, the packing section 113 packs the acquired patches as a video frame. For example, the packing section 113 places patches of position information (Geometry) indicative of positions of points in a two-dimensional image, places patches of attribute information (Texture) such as color information added to the position information in a two-dimensional image, and packs the two-dimensional images individually as video frames.

In that case, the packing section 113 performs packing on the basis of the projection direction information and encoding unit information supplied from the metadata generation section 112. In other words, the packing section 113 controls the encoding unit (frame, slice, tile, or the like) for placement of each patch according to the projection direction of the patch as described hereinabove. In other words, the packing section 113 places each patch in an encoding unit corresponding to the projection direction of the patch.

It is to be noted that the packing section 112 also performs generation of an occupancy map indicative of presence or absence of data at each position and a Dilation process. The packing section 113 supplies various kinds of processed data to a processing section in a succeeding stage. For example, the packing section 113 supplies a video frame of position information (Geometry) to the video encoding section 115. Further, for example, the packing section 113 supplies a video frame of attribute information (Texture) to the video encoding section 116. Furthermore, for example, the packing section 113 supplies an occupancy map to the OMap encoding section 117. Further, the packing section 113 supplies control information relating to the packing to the multiplexer 118.

The auxiliary patch information compression section 114 performs a process relating to compression of auxiliary patch information. For example, the auxiliary patch information compression section 114 acquires data supplied from the patch decomposition section 111. The auxiliary patch information compression section 114 encodes (compresses) auxiliary patch information included in the acquired data. The auxiliary patch information compression section 114 supplies the obtained encoded data of the auxiliary patch information to the multiplexer 118.

The video encoding section 115 performs a process relating to encoding of a video frame of position information (Geometry). For example, the video encoding section 115 acquires a video frame of position information (Geometry) supplied from the packing section 113. Further, the video encoding section 115 encodes the acquired video frame of the position information (Geometry) by any encoding method for a two-dimensional image such as AVC or HEVC. The video encoding section 115 supplies encoded data obtained by the encoding (encoded data of a video frame of position information (Geometry)) to the multiplexer 118.

It is to be noted that, at the time of the encoding, the video encoding section 115 may perform quality control of encoding on the basis of the projection direction information and intersymbol unit control information supplied from the metadata generation section 112. For example, the video encoding section 115 may control the quality (for example, a quantization parameter) of a video frame according to a display frequency of a patch included in the video frame and so forth.

The video encoding section 116 performs a process relating to encoding of a video frame of attribute information (Texture). For example, the video encoding section 116 acquires a video frame of attribute information (Texture) supplied from the packing section 113. Further, the video encoding section 116 encodes the acquired video frame of the attribute information (Texture) by any encoding method for a two-dimensional image such as AVC or HEVC. The video encoding section 116 supplies encoded data obtained by the encoding (encoded data of a video frame of the attribute information (Texture)) to the multiplexer 118.

It is to be noted that the video encoding section 116 may perform quality control of encoding on the basis of the projection direction information and the intersymbol unit control information supplied from the metadata generation section 112, similarly to the case of the video encoding section 115.

The OMap encoding section 117 performs a process relating to encoding of an occupancy map indicative of presence or absence of data for each position. For example, the OMap encoding section 117 acquires a video frame of an occupancy map supplied from the packing section 113. Further, the OMap encoding section 117 encodes the acquired occupancy map by any encoding method such as arithmetic encoding. The OMap encoding section 117 supplies encoded data of the occupancy map obtained by the encoding to the multiplexer 118.

It is to be noted that the OMap encoding section 117 may perform quality control of encoding on the basis of the projection direction information and the intersymbol unit control information supplied from the metadata generation section 112, similarly to the case of the video encoding section 115.

The multiplexer 118 performs a process relating to multiplexing. For example, the multiplexer 118 acquires encoded data of auxiliary patch information supplied from the auxiliary patch information compression section 114. Further, the multiplexer 118 acquires control information relating to packing supplied from the packing section 113. Further, the multiplexer 118 acquires encoded data of a video frame of position information (Geometry) supplied from the video encoding section 115. Further, the multiplexer 118 acquires encoded data of a video frame of attribute information (Texture) supplied from the video encoding section 116. Further, the multiplexer 118 acquires encoded data of an occupancy map supplied from the OMap encoding section 117.

Furthermore, the multiplexer 118 acquires the projection direction information and the encoding unit information supplied from the metadata generation section 112.

The multiplexer 118 multiplexes such acquired information as mentioned above to generate a bit stream. The multiplexer 118 outputs the generated bit stream to the outside of the encoding apparatus 100.

<Patch Decomposition Section>

Figure 10:
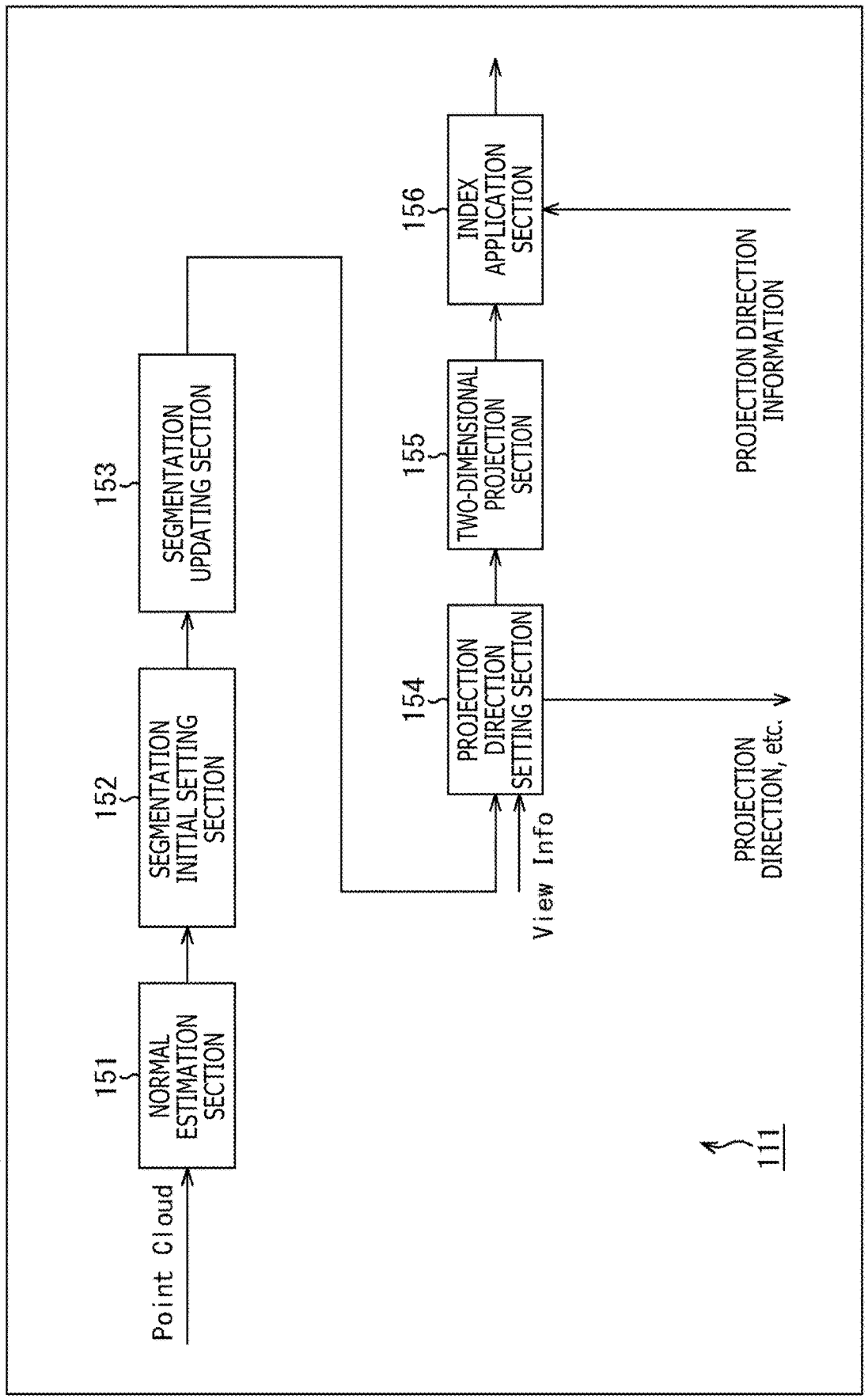
FIG. 10 is a diagram illustrating an example of principal components of a patch decomposition section.

FIG. 10 is a block diagram depicting an example of principal components of the patch decomposition section 111 of FIG. 9. As depicted in FIG. 10, the patch decomposition section 111 in such a case includes a normal estimation section 151, a segmentation initial setting section 152, a segmentation updating section 153, a projection direction setting section 154, a two-dimensional projection section 155, and an index application section 156.

The normal estimation section 151 performs a process relating to estimation of a normal to the surface of 3D data. For example, the normal estimation section 151 acquires 3D data (Point Cloud) inputted thereto. Further, the normal estimation section 151 estimates a normal to the surface of an object represented by the acquired 3D data. For example, the normal estimation section 151 constructs a kd-tree, searches the neighborhood, calculates a best fit tangent plane, and performs a further necessary process to estimate a normal. The normal estimation section 151 supplies a result of the estimation of a normal to the segmentation initial setting section 152 together with other data.

The segmentation initial setting section 152 performs a process relating to initial setting of segmentation. For example, the segmentation initial setting section 152 acquires data supplied from the normal estimation section 151. Further, the segmentation initial setting section 152 classifies, on the basis of a component of the normal estimated by the normal estimation section 151 in each of directions of six axes, a face of the 3D data corresponding to the normal. The segmentation initial setting section 152 supplies a result of the classification to the segmentation updating section 153 together with other data.

The segmentation updating section 153 performs a process relating to updating of segmentations. For example, the segmentation updating section 153 acquires data supplied from the segmentation initial setting section 152. Further, the segmentation updating section 153 collects excessively small regions in the segmentation of the initial setting set by the segmentation initial setting section 152 to form a sufficiently large region. The segmentation updating section 153 supplies information relating to the updated segmentations to the projection direction setting section 154 together with other information.

The projection direction setting section 154 performs a process relating to setting of a projection direction. For example, the projection direction setting section 154 acquires data (including information relating to updated segmentations) supplied from the segmentation updating section 153. Further, the projection direction setting section 154 acquires View Info that is information relating to the View direction. The projection direction setting section 154 sets a projection direction of each segmentation on the basis of the acquired information. For example, the projection direction setting section 154 sets a projection direction on the basis of a normal to each segmentation, a supposed View direction, and so forth such that occurrence of occlusion is suppressed. Further, for example, the projection direction setting section 154 sets a projection direction on the basis of a normal to each segmentation, a supposed View direction, and so forth such that increase of the number of patches to be generated is suppressed.

The projection direction setting section 154 supplies information relating to the projection directions thus set and so forth to the metadata generation section 112. Further, the projection direction setting section 154 supplies the information relating to the projection directions and so forth to the two-dimensional projection section 155 together with other information such as information relating to the updated segmentation.

The two-dimensional projection section 155 performs a process relating to two-dimensional projection of 3D data. For example, the two-dimensional projection section 155 acquires data supplied from the projection direction setting section 154. Further, the two-dimensional projection section 155 projects each segmentation on a two-dimensional plane in a projection direction of the segmentation to generate a patch. For example, the two-dimensional projection section 155 generates patches of position information (Geometry) and attribute information (Texture). The two-dimensional projection section 155 supplies the generated patches of position information (Geometry) and the generated patches of attribute information (Texture) to the index application section 156 together with other data.

The index application section 156 performs a process relating to application of a projection direction index. For example, the index application section 156 acquires data supplied from the two-dimensional projection section 155. Further, the index application section 156 acquires projection direction information supplied from the metadata generation section 112. Further, the index application section 156 applies, to each patch, a projection direction index associated with the projection direction of the patch, on the basis of the acquired projection direction information. The index application section 156 supplies the processed data (patches of position information (Geometry) and patches of attribute information (Texture) to which the projection direction indices are applied, and so forth) to the packing section 113.

<Metadata Generation Section>

Figure 11:
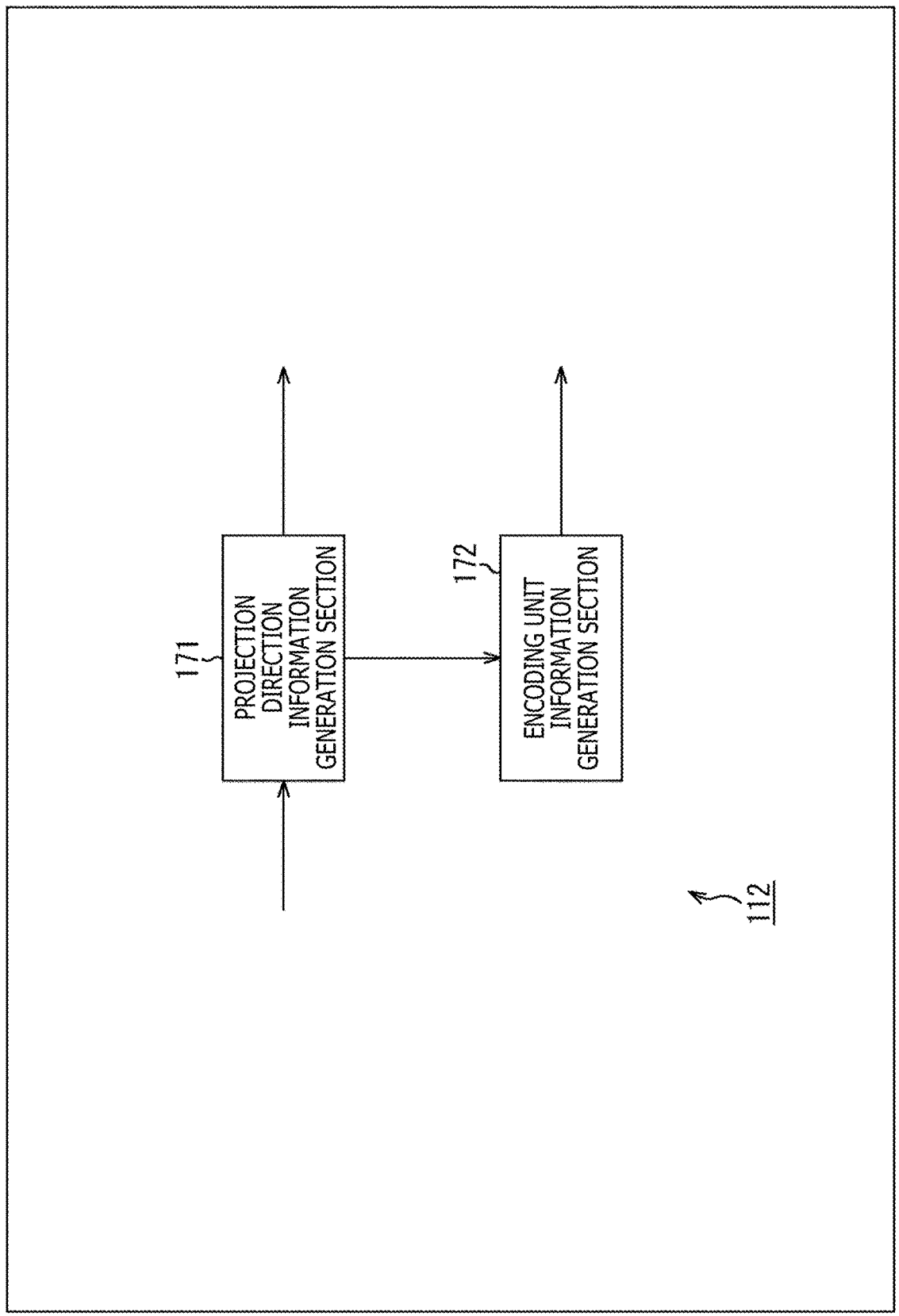
FIG. 11 is a diagram illustrating an example of principal components of a metadata generation section.

FIG. 11 is a block diagram depicting an example of principal components of the metadata generation section 112 of FIG. 9. As depicted in FIG. 11, the metadata generation section 112 includes a projection direction information generation section 171 and an encoding unit information generation section 172.

The projection direction information generation section 171 performs a process relating to generation of projection direction information. For example, the projection direction information generation section 171 acquires information relating to a projection direction and so forth supplied from the patch decomposition section 111. Further, the projection direction information generation section 171 sets a projection direction on the basis of the information and adds a projection direction index to the projection direction to generate projection direction information. Further, the projection direction information generation section 171 adds attribute information to each projection direction index as occasion demands.

The projection direction information generation section 171 supplies the generated projection direction information to the encoding unit information generation section 172. Further, the projection direction information generation section 171 also supplies the projection direction information to the patch decomposition section 111, packing section 113, video encoding section 115, video encoding section 116, OMap encoding section 117, and multiplexer 118.

The encoding unit information generation section 172 performs a process relating to generation of encoding unit information. For example, the encoding unit information generation section 172 acquires projection direction information supplied from the projection direction information generation section 171. Further, the encoding unit information generation section 172 sets an encoding unit for placement of a patch with each projection direction and associates information indicative of the encoding unit with a projection direction index to generate encoding unit information.

The encoding unit information generation section 172 supplies the generated encoding unit information to the packing section 113, video encoding section 115, video encoding section 116, OMap encoding section 117, and multiplexer 118.

<Decoding Apparatus>

Figure 12:
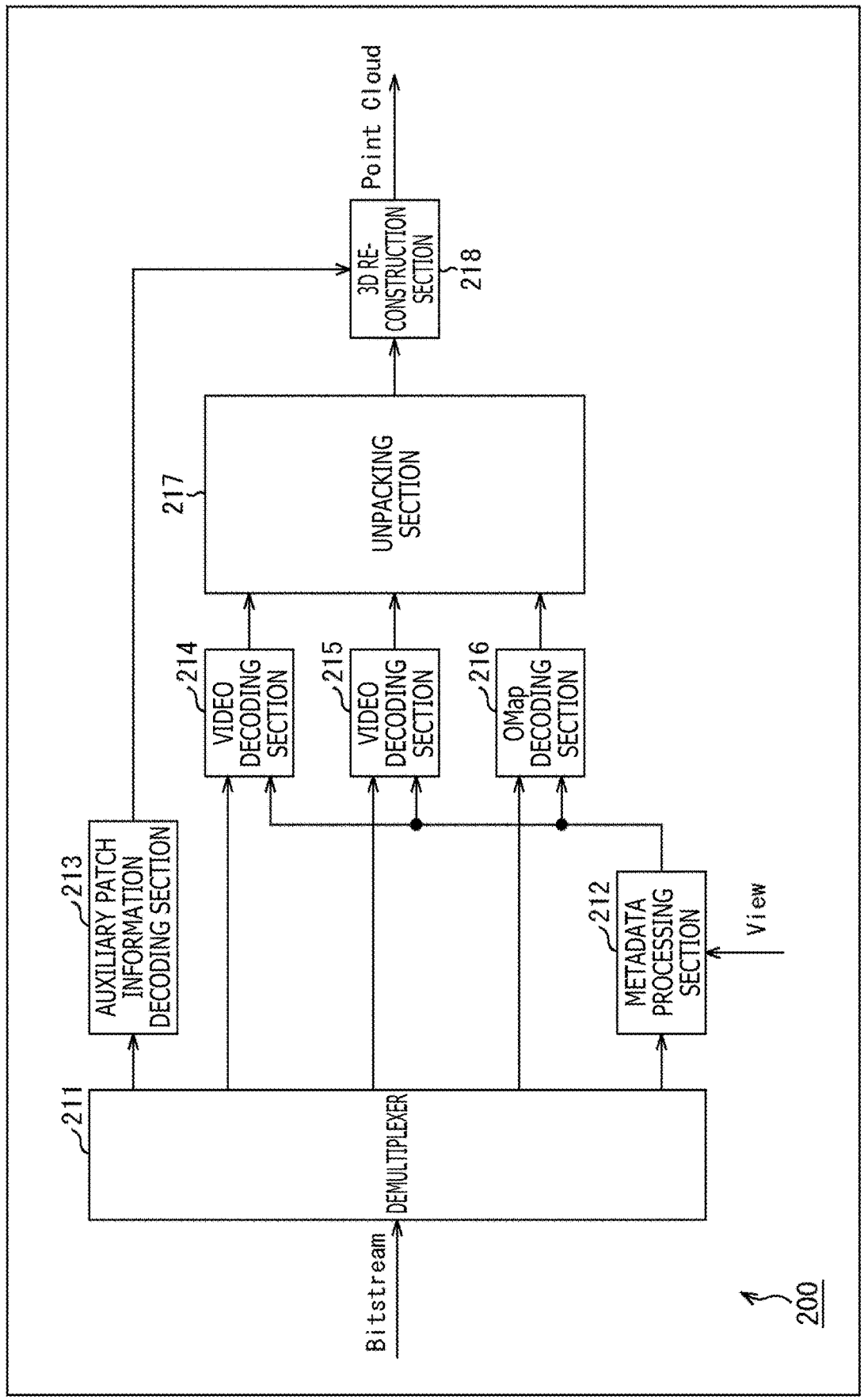
FIG. 12 is a block diagram depicting an example of principal components of a decoding apparatus.

FIG. 12 is a block diagram depicting an example of a configuration of a decoding apparatus that is a mode of the image processing apparatus to which the present technology is applied. An decoding apparatus 200 depicted in FIG. 12 is an apparatus that decodes encoded data obtained by projecting 3D data such as a point cloud on a two-dimensional plane and encoding the data, by a decoding method for a two-dimensional image and projects the decoded data in a three-dimensional space (decoding apparatus to which the video based approach is applied).

It is to be noted that FIG. 12 depicts principal ones of processing sections, data flows, and so forth, and not all of such processing sections and data flows are depicted in FIG. 12. In other words, the decoding apparatus 200 may include a processing section that is not depicted as a block in FIG. 12 or may include a process or a data flow that is not depicted as an arrow or the like in FIG. 12. This is similarly applied to the other figures illustrating the processing sections and so forth in the decoding apparatus 200.

As depicted in FIG. 12, the decoding apparatus 200 includes a demultiplexer 211, a metadata processing section 212, an auxiliary patch information decoding section 213, a video decoding section 214, a video decoding section 215, an OMap decoding section 216, an unpacking section 217, and a 3D re-construction section 218.

The demultiplexer 211 performs a process relating to demultiplexing of data. For example, the demultiplexer 211 acquires a bit stream inputted to the decoding apparatus 200. The bit stream is supplied, for example, from the encoding apparatus 100. The demultiplexer 211 demultiplexes the bit stream to extract encoded data of auxiliary patch information and supplies the encoded data to the auxiliary patch information decoding section 213. Further, the demultiplexer 211 extracts encoded data of a video frame of position information (Geometry) from the bit stream by demultiplexing and supplies the encoded data to the video decoding section 214. Furthermore, the demultiplexer 211 extracts encoded data of a video frame of attribute information (Texture) from the bit stream by demultiplexing and supplies the encoded data to the video decoding section 215. Further, the demultiplexer 211 extracts encoded data of an occupancy map from the bit stream by demultiplexing and supplies the encoded data to the OMap decoding section 216.

Furthermore, the demultiplexer 211 extracts metadata such as projection direction information and encoding unit information from a bit stream by demultiplexing and supplies the metadata to the metadata processing section 212.

The metadata processing section 212 performs a process relating to decoding control based on metadata. For example, the metadata processing section 212 acquires metadata (projection direction information, encoding unit information, and so forth) supplied from the demultiplexer 211. Further, the metadata processing section 212 acquires a designation (View) of a View direction by a user or the like. The metadata processing section 212 controls decoding by the video decoding section 214, video decoding section 215, and OMap decoding section 216, on the basis of the metadata, View direction, and so forth. For example, the metadata processing section 212 controls the decoding order of patches and the range of patches to be decoded (partial decoding).

The auxiliary patch information decoding section 213 performs a process relating to decoding of encoded data of auxiliary patch information. For example, the auxiliary patch information decoding section 213 acquires encoded data of auxiliary patch information supplied from the demultiplexer 211. Further, the auxiliary patch information decoding section 213 decodes the encoded data of the patch information included in the acquired data. The auxiliary patch information decoding section 213 supplies the auxiliary patch information obtained by the decoding to the 3D re-construction section 218.

The video decoding section 214 performs a process relating to decoding of encoded data of a video frame of position information (Geometry). For example, the video decoding section 214 acquires encoded data of a video frame of position information (Geometry) supplied from the demultiplexer 211. Further, the video decoding section 214 accepts control of the metadata processing section 212.

Further, the video decoding section 214 decodes encoded data acquired from the demultiplexer 211 under the control of the metadata processing section 212 to obtain a video frame of position information (Geometry). For example, the video decoding section 214 decodes encoded data of an encoding unit corresponding to a projection direction of position information (Geometry) on a two-dimensional plane and designated by the metadata processing section 212. For example, the video decoding section 214 decodes encoded data of encoding units in a decoding range designated by the metadata processing section 212. Further, for example, the video decoding section 214 decodes encoded data of encoding units in a decoding order designated by the metadata processing section 212. The video decoding section 214 supplies the data of the decoded position information (Geometry) of the encoding units to the unpacking section 217.

The video decoding section 215 performs a process relating to decoding of encoded data of a video frame of attribute information (Texture). For example, the video decoding section 215 acquires encoded data of a video frame of attribute information (Texture) supplied from the demultiplexer 211. Further, the video decoding section 215 accepts control of the metadata processing section 212.

Further, the video decoding section 215 decodes encoded data acquired from the demultiplexer 211 under the control of the metadata processing section 212 to obtain a video frame of attribute information (Texture). For example, the video decoding section 215 decodes encoded data of encoding units in a decoding range designated by the metadata processing section 212. Further, for example, the video decoding section 215 decodes encoded data of each encoding unit in a decoding order designated by the metadata processing section 212. The video decoding section 215 supplies the data of the decoded attribute information (Texture) of the encoding units to the unpacking section 217.

The OMap decoding section 216 performs a process relating to decoding of encoded data of an occupancy map. For example, the OMap decoding section 216 acquires encoded data of an occupancy map supplied from the demultiplexer 211. Further, the OMap decoding section 216 accepts control of the metadata processing section 212.

Further, the OMap decoding section 216 decodes encoded data acquired from the demultiplexer 211 under the control of the metadata processing section 212 to obtain an occupancy map. For example, the OMap decoding section 216 decodes encoded data of encoding units in a decoding range designated by the metadata processing section 212. Further, for example, the OMap decoding section 216 decodes encoded data of each encoding unit in a decoding order designated by the metadata processing section 212. The OMap decoding section 216 supplies the decoded data of the occupancy map of the encoding units to the unpacking section 217.

The unpacking section 217 performs a process relating to unpacking. For example, the unpacking section 217 acquires a video frame (data of an encoding unit) of position information (Geometry) from the video decoding section 214, acquires a video frame (data of an encoding unit) of attribute information (Texture) from the video decoding section 215, and acquires an occupancy map (data of an encoding unit) from the OMap decoding section 216. Further, the unpacking section 217 unpacks a video frame of position information and a video frame of attribute information. The unpacking section 217 supplies various kinds of data such as data (patches and so forth) of the position information (Geometry) and data (patches and so forth) of the attribute information (Texture) obtained by unpacking as well as data of the occupancy map and so forth to the 3D re-construction section 218.

The 3D re-construction section 218 performs a process relating to re-construction of 3D data. For example, the 3D re-construction section 218 re-constructs 3D data (Point Cloud), on the basis of auxiliary patch information supplied from the auxiliary patch information decoding section 213, and data of position information (Geometry), data of attribute information (Texture), data of an occupancy map, and so forth supplied from the unpacking section 217. The 3D re-construction section 218 outputs the 3D data obtained by such processes as described above to the outside of the decoding apparatus 200.

The 3D data is supplied, for example, to a display section such that an image thereof is displayed, recorded on a recording medium, or supplied to another apparatus through communication.

<Metadata Processing Section>

Figure 13:
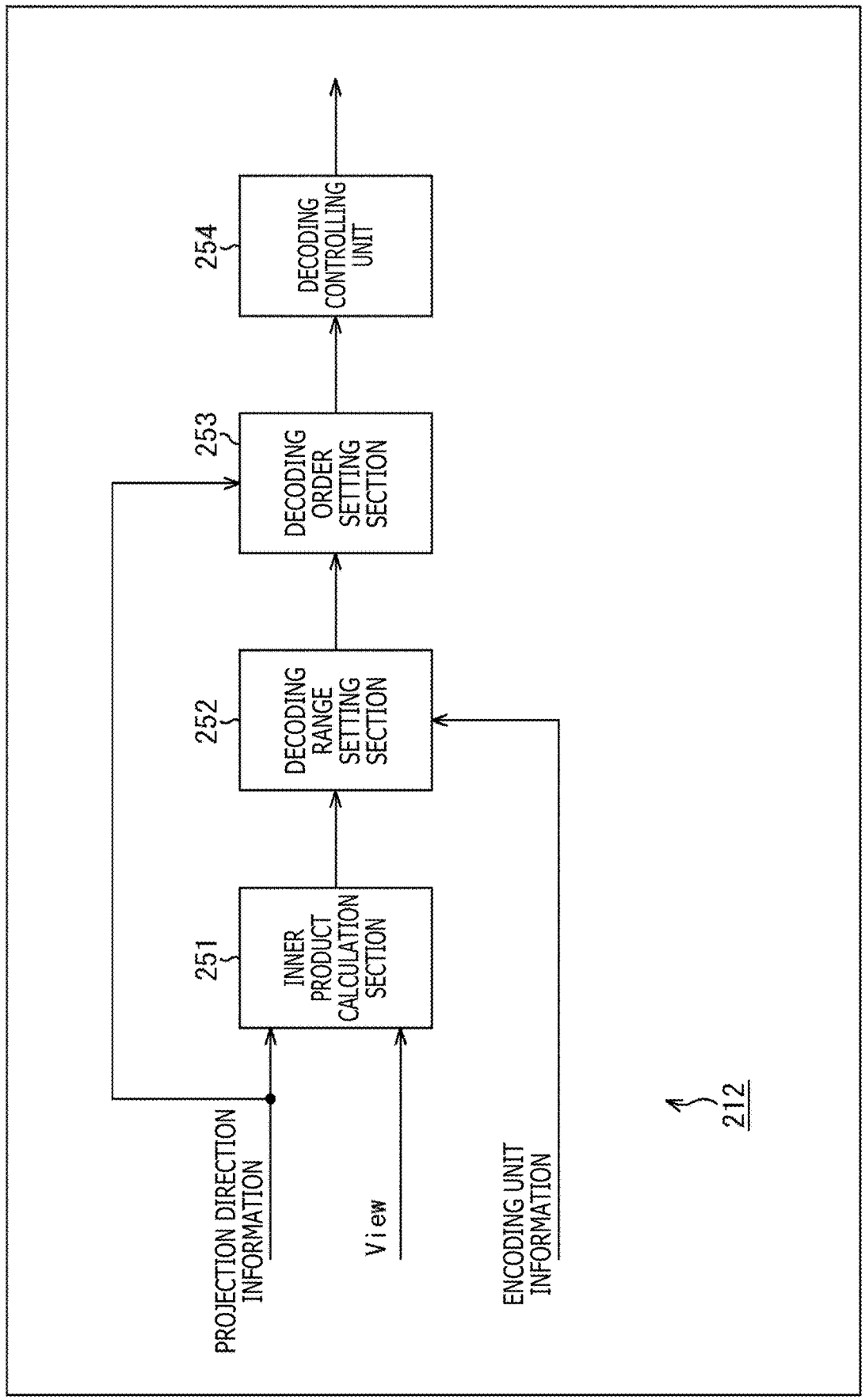
FIG. 13 is a block diagram depicting an example of principal components of a metadata processing section.

FIG. 13 is a block diagram depicting an example of principal components of the metadata processing section 212 of FIG. 12. As depicted in FIG. 13, the metadata processing section 212 includes an inner product calculation section 251, a decoding range setting section 252, a decoding order setting section 253, and a decoding controlling unit 254.

The inner product calculation section 251 performs a process relating to calculation of an inner product. For example, the inner product calculation section 251 acquires projection direction information supplied from the demultiplexer 211. Further, the inner product calculation section 251 acquires a designation of a View direction inputted by a user or the like. Further, the inner product calculation section 251 calculates an inner product between a vector indicative of a projection direction and a vector indicative of a View direction. The inner product calculation section 251 supplies a result of the calculation of the inner product to the decoding range setting section 252.

The decoding range setting section 252 performs a process relating to setting of a decoding range. For example, the decoding range setting section 252 acquires a result of an inner product supplied from the inner product calculation section 251. Further, the decoding range setting section 252 acquires encoding unit information supplied from the demultiplexer 211. Further, the decoding range setting section 252 sets a decoding range (encoding units to be decoded) on the basis of the result of the inner product and the encoding unit information. In particular, the decoding range setting section 252 controls whether or not partial decoding is to be performed, and further controls, in the case where partial decoding is to be performed, the range for which decoding is to be performed. The decoding range setting section 252 supplies the result of the inner product, the encoding unit information, and information relating to the set decoding range to the decoding order setting section 253.

The decoding order setting section 253 performs a process relating to setting of a decoding order. For example, the decoding order setting section 253 acquires information supplied from the decoding range setting section 252. Further, the decoding order setting section 253 acquires projection direction information supplied from the demultiplexer 211. Further, the decoding order setting section 253 sets a decoding order of encoding units to be decoded, on the basis of a result of the inner product, projection direction information, encoding unit information, information relating to a decoding range, and so forth, such that the decoding order corresponds to a setting for a decoding order, a setting of a decoding range, and a View direction. The decoding order setting section 253 supplies the result of the inner product, encoding unit information, information relating to the decoding range, and information relating to the set decoding order to the decoding controlling unit 254.

The decoding controlling unit 254 performs a process relating to control of decoding. For example, the decoding controlling unit 254 acquires information supplied from the decoding order setting section 253. Further, the decoding controlling unit 254 controls decoding by the video decoding section 214, video decoding section 215, and OMap decoding section 216 on the basis of the acquired information. For example, the decoding controlling unit 254 designates an encoding unit as a target of decoding to be performed by the processing sections. Further, for example, the decoding controlling unit 254 controls designation of a decoding range, a decoding order, and so forth of decoding to be performed by the processing sections.

Since a projection direction can be set as desired by including such a configuration as described above, it is possible to suppress occurrence of occlusion and suppress increase of the number of patches. Further, in various decoding methods such as a method in which a patch with a more appropriate projection direction is selected and decoded according to a View direction or the like, encoded data of 3D data can also be decoded with increased ease. Therefore, increase of the load of the decoding process can be suppressed.

Further, by including such a configuration as described above, it is possible to easily control the decoding order of patches or implement partial decoding in which only part of patches are decoded. In other words, encoded data of 3D data can be decoded with increased ease, and increase of the load of the decoding process can be suppressed.

<Flow of Encoding Process>

Now, an example of a flow of an encoding process executed by the encoding apparatus 100 is described with reference to a flow chart of FIG. 14.

After the encoding process is started, the patch decomposition section 111 of the encoding apparatus 100 projects 3D data on a two-dimensional plane to decompose the 3D data into patches in step S101.

In step S102, the metadata generation section 112 generates projection direction information and encoding unit information as metadata.

In step S103, the patch decomposition section 111 (index application section 156) applies (associates) a projection direction index to each patch according to projection direction information generated in step S102.

In step S104, the auxiliary patch information compression section 114 compresses auxiliary patch information obtained by the process in step S101.

In step S105, the packing section 113 performs packing according to the projection direction information and the encoding unit information generated in step S102 and so forth. In particular, the packing section 113 places each patch in an encoding unit (slice or the like) corresponding to the projection direction of the patch in the frame image to pack them as a video frame. Further, the packing section 113 generates an occupancy map corresponding to the video frame.

In step S106, the video encoding section 115 encodes a geometry video frame that is a video frame of position information obtained by the process in step S105, by an encoding method for a two-dimensional image.

In step S107, the video encoding section 116 encodes a color video frame that is a video frame of attribute information obtained by the process in step S105, by an encoding method for a two-dimensional image.

In step S108, the OMap encoding section 117 encodes the occupancy map obtained by the process in step S105, by a predetermined encoding method.

It is to be noted that the video encoding section 115 to OMap encoding section 117 may individually control the quality on the basis of the projection direction information, encoding unit information, and so forth in the encoding performed individually by them (encoding in step S106 to step S108).

In step S109, the multiplexer 118 multiplexes the various kinds of information generated in such a manner as described above (for example, encoded data generated in step S106 to step S108 and metadata (projection direction information and encoding unit information) generated in step S102) to generate a bit stream that includes such information as described above.

In step S110, the multiplexer 118 outputs the bit stream generated by the process in step S109 to the outside of the encoding apparatus 100.

When the process in step S110 ends, the encoding process ends.

<Flow of Patch Decomposition Process>

Figure 14:
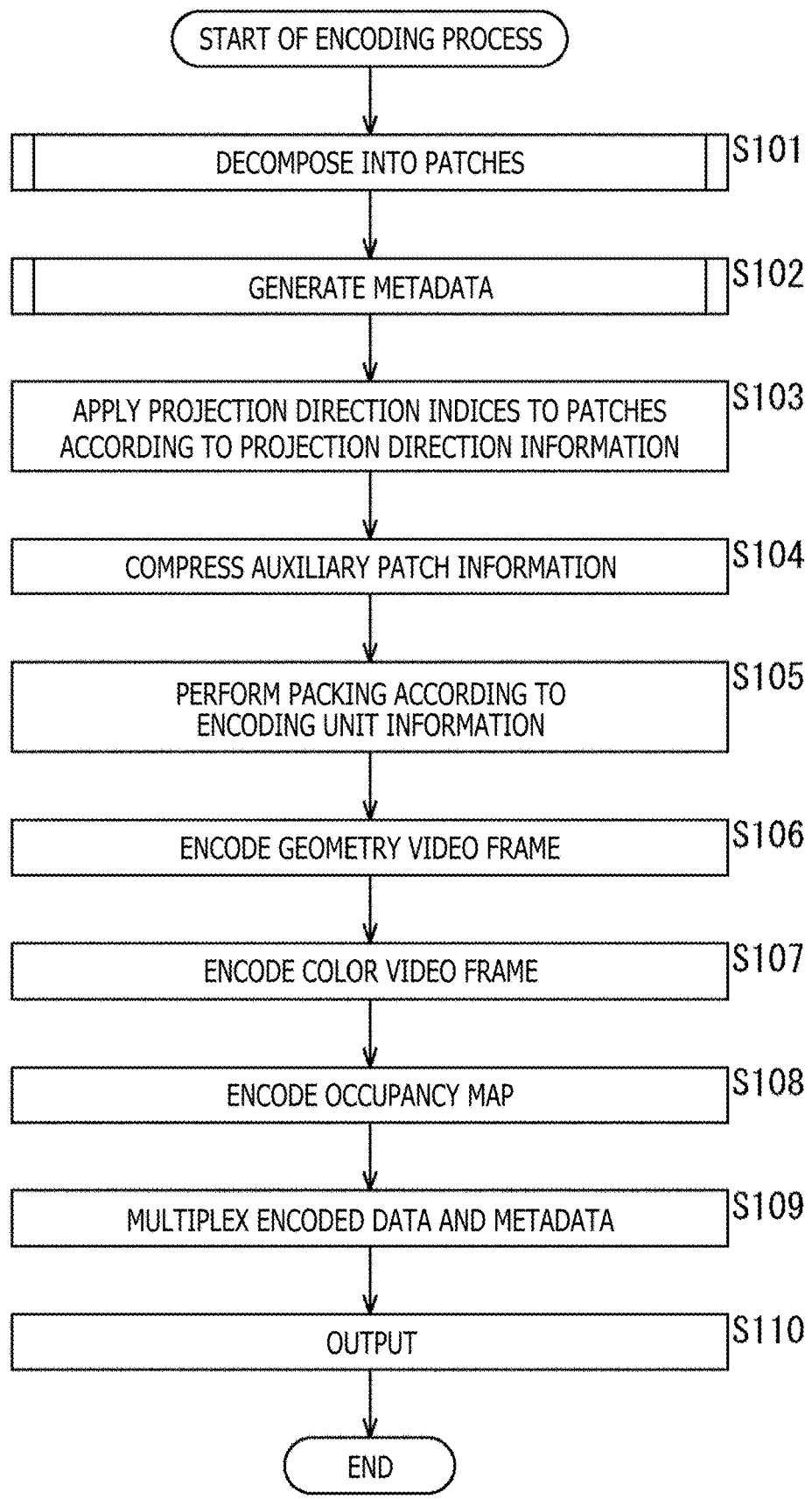
FIG. 14 is a flow chart illustrating an example of a flow of an encoding process.
Figure 15:
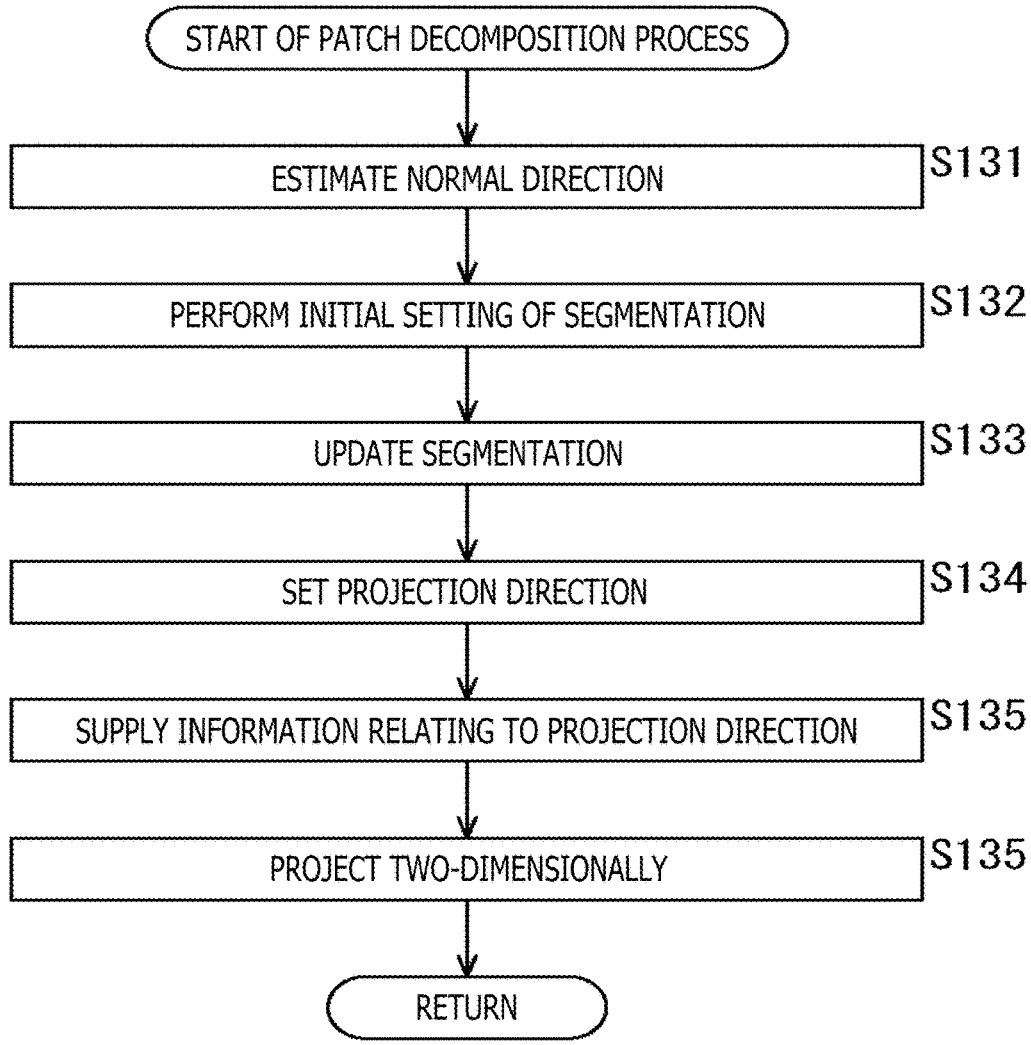
FIG. 15 is a flow chart illustrating an example of a flow of a patch decomposition process.

Now, an example of a flow of the patch decomposition process executed in step S101 of FIG. 14 is described with reference to a flow chart of FIG. 15.

After the patch decomposition process is started, the normal estimation section 151 estimates a normal to each face of 3D data in step S131.

In step S132, the segmentation initial setting section 152 performs initial setting for segmentation.

In step S133, the segmentation updating section 153 updates segmentations in the initial state set in step S132 as occasion demands.

In step S134, the projection direction setting section 154 sets a projection direction for each segmentation on the basis of, for example, View Info and so forth.

In step S135, the projection direction setting section 154 supplies information relating to the projection directions set in step S134 to the metadata generation section 112.

In step S136, the two-dimensional projection section 155 projects the segmentations of 3D data on a two-dimensional plane in the projection direction set in step S134.

When the process in step S136 ends, the patch decomposition process ends, and the processing returns to FIG. 14.

<Flow of Metadata Generation Process>

Figure 16:
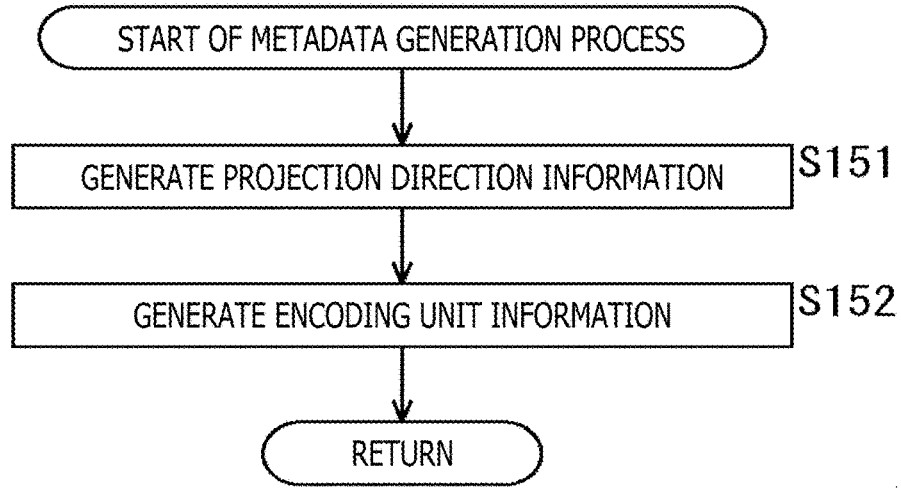
FIG. 16 is a flow chart illustrating an example of a flow of a metadata generation process.

Now, an example of a flow of the metadata generation process executed in step S102 of FIG. 14 is described with reference to a flow chart of FIG. 16.

After the metadata generation process is started, the projection direction information generation section 171 generates, in step S151, projection direction information on the basis of information relating to a projection direction supplied from the patch decomposition section 111 (projection direction setting section 154).

In step S152, the encoding unit information generation section 172 sets an encoding unit for projecting each patch and generates encoding unit information on the basis of the projection direction information generated in step S151.

When metadata such as the projection direction information and the encoding unit information is generated by the processes described above, the metadata generation process ends, and the processing returns to FIG. 14.

By executing the processes in such a manner as described above, a projection direction can be set as desired, and therefore, it is possible to generate a patch with a more appropriate projection direction and encode the patch, for example, according to the View direction or the like. Consequently, it becomes possible for the decoding side to decode encoded data of 3D data with increased ease. For example, it is possible to suppress occurrence of occlusion and suppress increase of the number of patches, and it is also possible to suppress increase of the load of the decoding process.

Further, by executing the processes in such a manner as described above, it is possible, upon decoding, to control the decoding order of patches easily or implement partial decoding in which part of the patches are decoded. In other words, it becomes possible for the decoding side to decode encoded data of 3D data with increased ease and suppress increase of the load of the decoding process.

<Flow of Decoding Process>

Now, an example of a flow of a decoding process executed by the decoding apparatus 200 is described with reference to a flow chart of FIG. 17.

After the decoding process is started, the demultiplexer 211 of the decoding apparatus 200 demultiplexes a bit stream in step S201.

In step S202, the auxiliary patch information decoding section 213 decodes auxiliary patch information extracted from the bit stream in step S201.

In step S203, the metadata processing section 212 controls decoding according to metadata (projection direction information and encoding unit information) extracted from the bit stream in step S201.

In step S204, the video decoding section 214 decodes encoded data of a geometry video frame (video frame of position information) extracted from the bit stream in step S201 according to the decoding control in step S203.

In step S205, the video decoding section 215 decodes encoded data of a color video frame (video frame of attribute information) extracted from the bit stream in step S201 according to the decoding control in step S203.

In step S206, the OMap decoding section 216 decodes encoded data of an occupancy map extracted from the bit stream in step S201 according to the decoding control in step S203.

In step S207, the unpacking section 217 unpacks the geometry video frame and the color video frame to extract patches.

In step S208, the 3D re-construction section 218 re-constructs 3D data of, for example, a point cloud and so forth on the basis of the auxiliary patch information obtained in step S202, the patches obtained in step S207, and so forth.

When the process in step S208 ends, the decoding process ends.

<Flow of Metadata Process>

Figure 17:
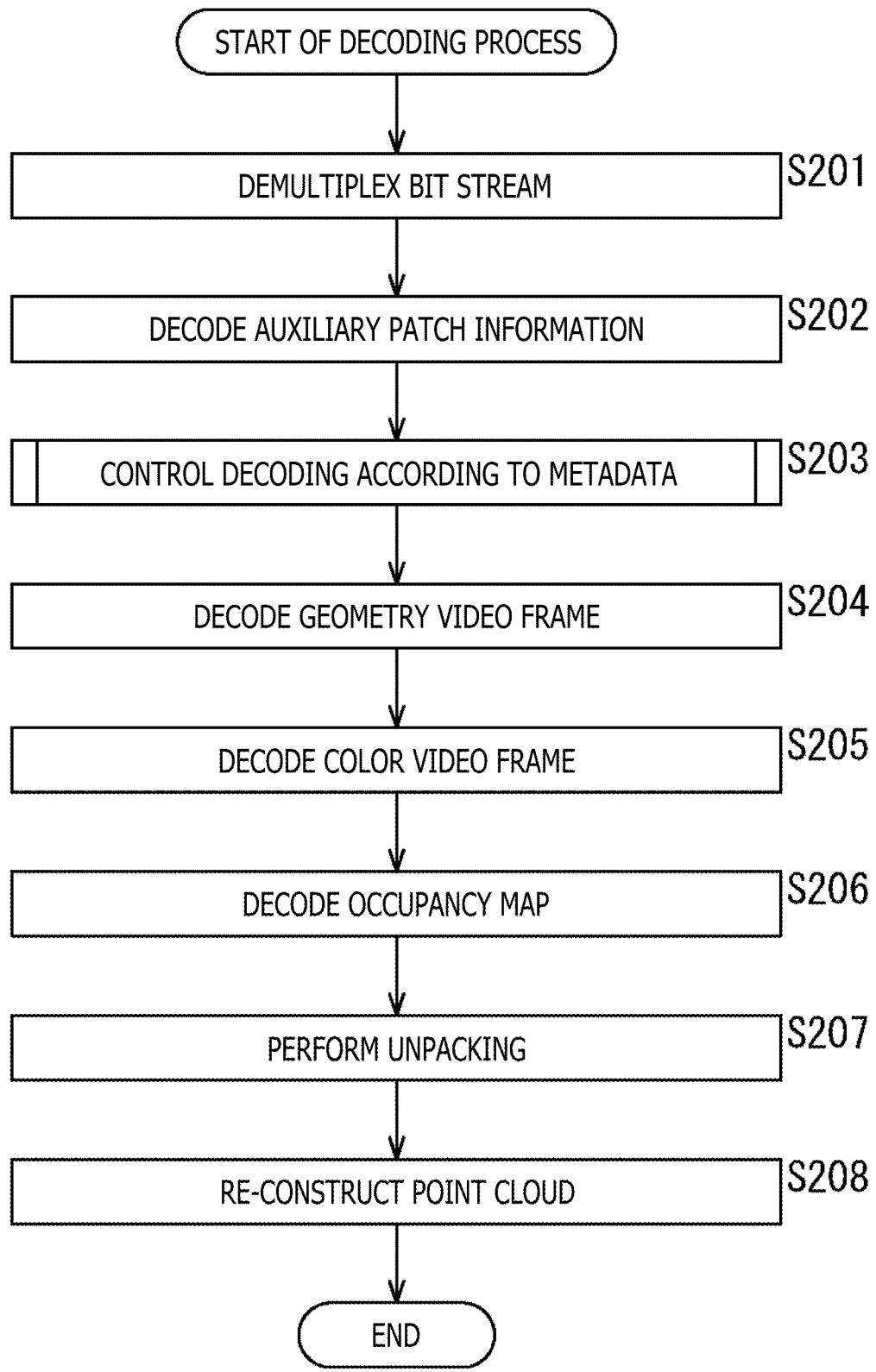
FIG. 17 is a flow chart illustrating an example of a flow of a decoding process.
Figure 18:
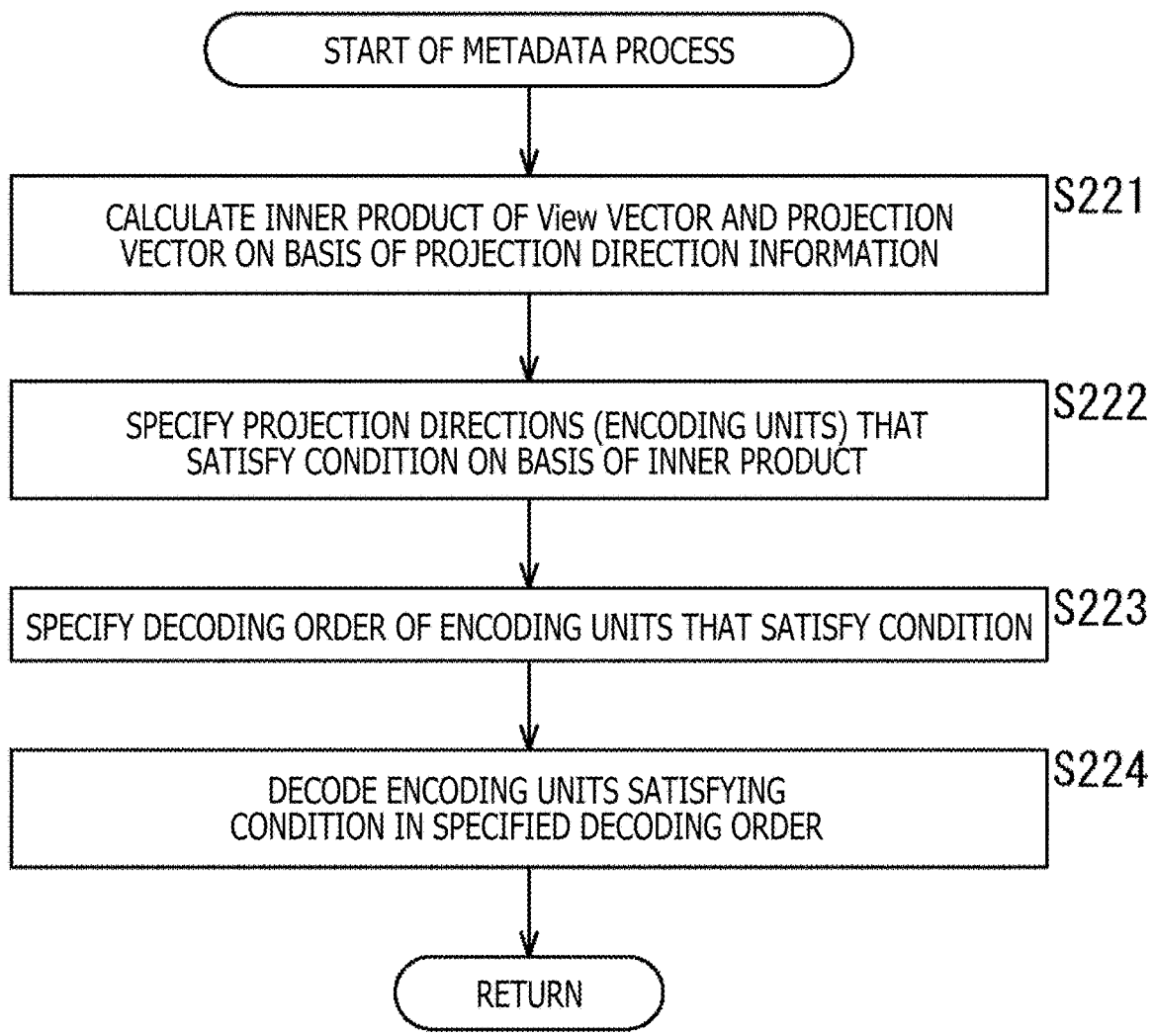
FIG. 18 is a flow chart illustrating an example of a flow of a metadata process.

Now, an example of a flow of the metadata process executed in step S203 of FIG. 17 is described with reference to a flow chart of FIG. 18.

After the metadata process is started, in step S221, the inner product calculation section 251 of the metadata processing section 212 calculates the inner product of a View vector indicative of a designated View direction and a projection vector indicative of a projection direction on the basis of projection direction information.

In step S222, the decoding range setting section 252 specifies a projection direction (encoding unit corresponding to the projection direction) that satisfies a condition, that is, a projection direction for encoding (encoding unit to be decoded), on the basis of a result of the inner product calculated in step S221 and encoding unit information.

In step S223, the decoding order setting section 253 specifies a decoding order of encoding units that satisfy the condition specified in step S222 on the basis of the projection direction information.

In step S224, the decoding controlling unit 254 controls the video decoding section 214, video decoding section 215, and OMap decoding section 216 to decode the "encoding units that satisfy the condition" specified in step S222 in the "decoding order" specified in step S223. The processes in step S204 to step S206 (FIG. 17) are executed according to the decoding control.

When the setting is performed in step S224 such that the decoding control is performed in such a manner as described above, the metadata process ends, and the processing returns to FIG. 17.

By executing the processes in such a manner as described above, a projection direction of a patch set as desired can be grasped easily, and therefore, in various decoding methods such as a method in which a patch with a more appropriate projection direction is selected and decoded according to a View direction or the like, encoded data of 3D data can also be decoded with increased ease. Therefore, increase of the load of the decoding process can be suppressed.

Further, by executing the processes in such a manner as described above, it is possible to control the decoding order of patches easily or implement partial decoding in which part of the patches are decoded. In other words, it becomes possible to decode encoded data of 3D data with increased ease and suppress increase of the load of the decoding process.

3. Appendix

<Control Information>

Control information relating to the present technology described in connection with each embodiment may be transmitted from the encoding side to the decoding side. For example, control information (for example, enabled flag) for controlling whether or not application of the present technology described above is to be permitted (or inhibited) may be transmitted. Further, for example, control information for designating a range within which it is permitted (or inhibited) to apply the present technology described above (for example, an upper limit or a lower limit to the block size or both of them, a slice, a picture, a sequence, a component, a view, a layer, or the like) may be transmitted.

<Computer>

While the series of processes described above can be executed by hardware or by software. In the case where the series of processes is executed by software, a program that constructs the software is installed in a computer. The computer here includes a computer incorporated in dedicated hardware or, for example, a general-purpose personal computer that can execute various functions by installing various programs therein.

Figure 19:
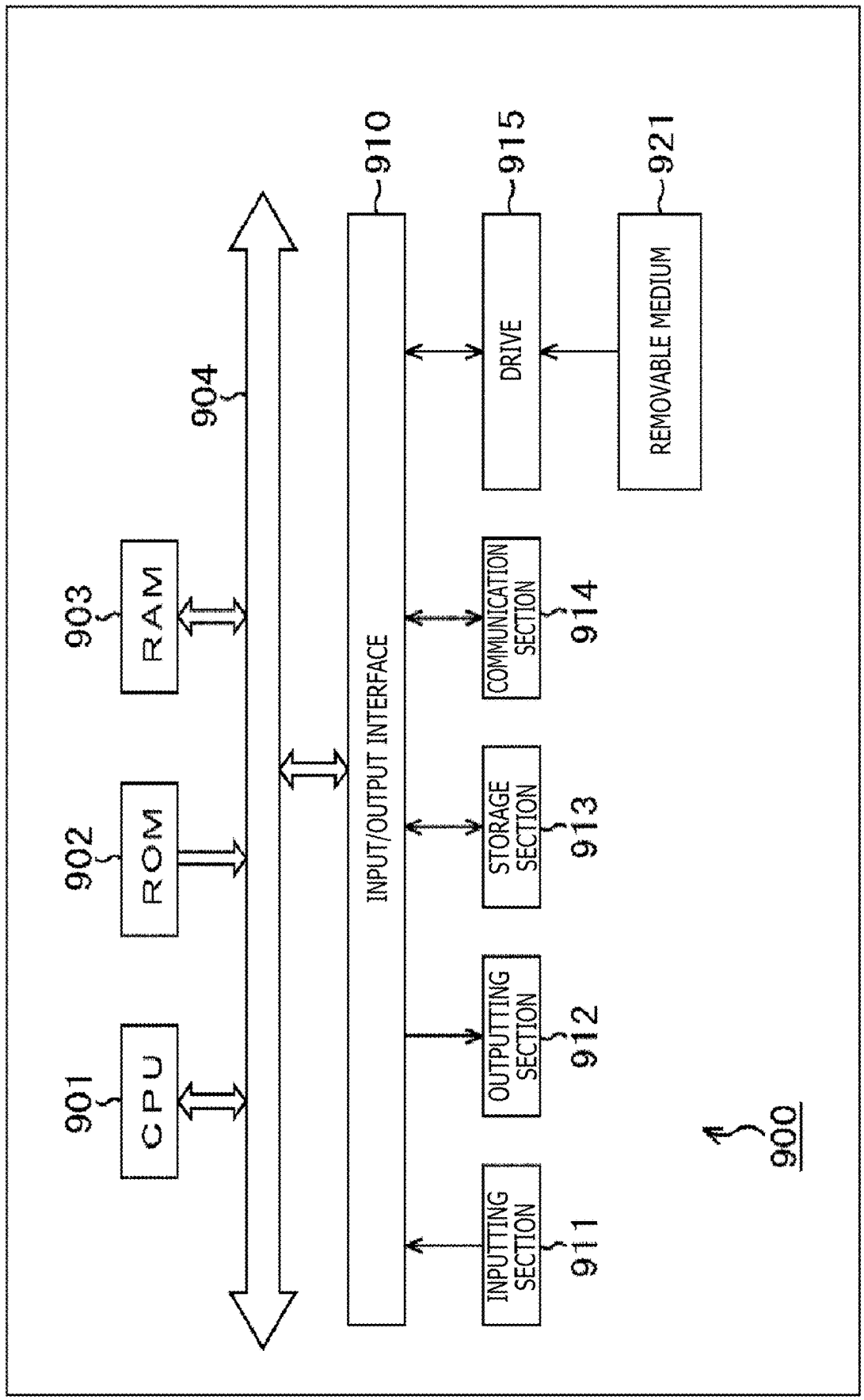
FIG. 19 is a block diagram depicting an example of principal components of a computer.

FIG. 19 is a block diagram depicting an example of a hardware configuration of a computer that executes the series of processes described hereinabove according to a program.

In a computer 900 depicted in FIG. 19, a CPU (Central Processing Unit) 901, a ROM (Read Only Memory) 902, and a RAM (Random Access Memory) 903 are connected to one another by a bus 904.

An input/output interface 910 is also connected to the bus 904. An inputting section 911, an outputting section 912, a storage section 913, a communication section 914, and a drive 915 are connected to the input/output interface 910.

The inputting section 911 includes, for example, a keyboard, a mouse, a microphone, a touch panel, an input terminal, and so forth. The outputting section 912 includes, for example, a display, a speaker, an output terminal, and so forth. The storage section 913 includes, for example, a hard disk, a RAM disk, a nonvolatile memory, or the like. The communication section 914 includes, for example, a network interface. The drive 915 drives a removable medium 921 such as a magnetic disk, an optical disk, a magneto-optical disk, or a semiconductor memory.

In the computer configured in such a manner as described above, the CPU 901 loads a program stored, for example, in the storage section 913 onto the RAM 903 through the input/output interface 910 and the bus 904 and executes the program to perform the series of processes described above. In the RAM 903, data and so forth necessary for the CPU 901 to execute various processes are also stored suitably.

The program to be executed by the computer (CPU 901) can be recorded on a removable medium 921 as, for example, a package medium and applied. In such a case, by mounting the removable medium 921 on the drive 915, the program can be installed in the storage section 913 through the input/output interface 910.

It is also possible to provide the program through a wired or wireless transmission medium such as a local area network, the Internet, or a digital satellite broadcast. In such a case, the program can be received by the communication section 914 and installed in the storage section 913.

Alternatively, it is also possible to install the program in the ROM 902 or the storage section 913 in advance.

<Application Target of Present Technology>

Although the foregoing description is directed to cases in which the present technology is applied to encoding-decoding of point cloud data, the present technology is not limited to those examples and can be applied to encoding-decoding of 3D data of any standard. In other words, specifications of various processes such as encoding and decoding methods and various kinds of data such as 3D data and metadata are determined as desired unless they are contradictory to the present technology described above. Further, part of the processes and specifications described above may be omitted unless they are contradictory to the present technology.

Further, while the foregoing description is directed to the encoding apparatus 100 and the decoding apparatus 200 as application examples of the present technology, the present technology can be applied to any configuration.

For example, the present technology can be applied to various kinds of electronic equipment such as a transmitter and a receiver (for example, a television receiver and a portable telephone set) in satellite broadcasting, cable broadcasting of a cable TV, delivery on the Internet, or delivery to a terminal by cellular communication, or an apparatus that records an image on a medium such as an optical disk, a magnetic disk, or a flash memory or reproduces an image from such storage media (for example, a hard disk recorder and a camera).

Further, for example, the present technology can be carried out as a configuration of part of an apparatus such as a processor as a system LSI (Large Scale Integration) or the like (for example, a video processor), a module that uses a plurality of processors and so forth (for example, a video module), a unit that uses a plurality of modules and so forth (for example, a video unit), or a set in which another function is added to a unit (for example, a video set).

Further, for example, the present technology can also be applied to a network system including a plurality of apparatuses. For example, the present technology may be carried out in cloud computing in which a plurality of apparatuses shares and cooperates for processing through a network. The present technology may be carried out in a cloud service that provides a service relating to an image (moving image) to any terminal such as a computer, AV (Audio Visual) equipment, a portable information processing terminal, or an IoT (Internet of Things) device.

It is to be noted that, in the present specification, the term "system" is used to signify an aggregation of a plurality of components (devices, modules (parts), and so forth), and it does not matter whether or not all components are accommodated in the same housing. Accordingly, a plurality of apparatuses accommodated in separate housings and connected to each other through a network is a system, and one apparatus in which a plurality of modules is accommodated in a single housing is also a system.

<Field and Use to which Present Technology is Applicable>

A system, an apparatus, a processing unit, and so forth to which the present technology is applied can be used in any field, for example, for traffics, medical care, crime prevention, agriculture, livestock industry, mining, beauty, factories, home appliances, weather, and natural surveillance. In addition, the use of them is also determined as desired.

<Others>

It is to be noted that the term "flag" in the present specification signifies information for identifying a plurality of states and includes not only information to be used when two states of the true (1) and the false (0) are identified but also information capable of identifying three or more states. Accordingly, the value that can be taken by the "flag" may be, for example, two values of I/O or may be three values or more. In other words, the number of bits configuring the "flag" is determined as desired and may be 1 bit or a plurality of bits. Further, the identification information (including a flag) is assumed to have not only a form in which the identification information is included in a bit stream but also a form in which difference information of the identification information from information that becomes a certain reference is included in a bit stream. Therefore, in the present specification, the "flag" and the "identification information" include not only such information as described above but also difference information of such information from reference information.

Further, various kinds of information (metadata and so forth) relating to encoded data (bit stream) may be transmitted or recorded in any form if they are associated with the encoded data. Here, the term "associate" signifies that, for example, when one of pieces of data is processed, the other one of the data can be used (linked). In other words, pieces of data associated with each other may be put together as one data or may be individual separate data. For example, information associated with encoded data (image) may be transmitted on a transmission line different from that of the encoded data (image). Further, for example, information associated with encoded data (image) may be recorded on a recording medium separate from that of the encoded data (image) (or in a recording area of the same recording medium). It is to be noted that part of such data may be "associated" instead of the overall data. For example, an image and information corresponding to the image may be associated with each other in any unit such as a plurality of frames, one frame, or a portion in a frame.

It is to be noted that, in the present specification, such terms as "synthesize," "multiplex," "add," "integrate," "include," "store," "incorporate," "put in," and "insert" signify that multiple things are combined in one, such as the case in which encoded data and metadata are combined in one data, and signifies one method of the "association" described above.

Further, the embodiment of the present technology is not limited to the embodiment described hereinabove and allows various alterations without departing from the subject matter of the present technology.

For example, the configuration described as one apparatus (or one processing section) may be divided so as to configure a plurality of apparatuses (or processing sections). Conversely, the configurations described as a plurality of apparatuses (or processing sections) in the foregoing description may be put together so as to configure a single apparatus (or processing section). Further, needless to say, a configuration not described hereinabove may be added to the configuration of each of the apparatuses (or each of the processing sections). Furthermore, if a configuration or operation of an entire system is substantially same, then some of the components of a certain apparatus (or processing section) may be included in the configuration of another apparatus (or another processing section).

Further, for example, the program described above may be executed by any apparatus. In such a case, it is sufficient if the apparatus has necessary functions (functional blocks and so forth) and can obtain necessary information.

Further, for example, the respective steps of one flow chart may be executed by a single apparatus or may be shared and executed by a plurality of apparatuses. Further, in the case where a plurality of processes is included in one step, the plurality of processes may be executed by one apparatus or may be shared and executed by a plurality of apparatuses. In other words, it is also possible to execute a plurality of processes included in one step as a process of a plurality of steps. Conversely, it is also possible to execute a process described as a plurality of steps collectively as one step.

Further, for example, in a program to be executed by a computer, processes in steps that describe the program may be carried out in a time series in the order as described in the present specification or may be executed in parallel or executed individually at necessary timings such as when the process is called. In other words, the processes in the respective steps may be executed in an order different from the order described hereinabove unless they do not give rise to a contradiction. Further, the processes in the steps that describe the program may be executed in parallel to processes of another program or may be executed in combination with processes of another program.

Further, for example, a plurality of technologies relating to the present technology can be carried out alone and independently of each other unless they do not give rise to a contradiction. Needless to say, any of a plurality of present technologies can be carried out together. For example, it is also possible to carry out part or the entirety of the present technology described in connection with any embodiment in combination with part or the entirety of the present technology described in connection with another embodiment. It is also possible to carry out any part or the entirety of the present technology described hereinabove together with another technology that is not described hereinabove.

It is to be noted that the present technology can also include such a configuration as described below.

(1) An image processing apparatus including:
a bit stream generation section configured to generate a bit stream that includes projection direction information including information relating to a projection direction of position information of 3D data representative of a three-dimensional structure on a two-dimensional plane and encoded data of a geometry image obtained by projecting the position information on the two-dimensional plane.

(2) The image processing apparatus according to (1), in which
the projection direction information includes information relating to a correspondence of an identifier to a direction and a position at the time of projecting the position information on the two-dimensional plane.

(3) The image processing apparatus according to (2), in which
the projection direction information further includes attribute information relating to decoding.

(4) The image processing apparatus according to (3), in which
the attribute information includes information relating to a decoding order.

(5) The image processing apparatus according to (3), in which
the attribute information includes meaning information indicative of a characteristic in the three-dimensional structure.

(6) The image processing apparatus according to (1), further including:
a projection direction information generation unit configured to generate the projection direction information, in which
the bit stream generation section generates a bit stream that includes the projection direction information generated by the projection direction information generation section and the encoded data.

(7) The image processing apparatus according to (1), further including:
a packing section configured to place and pack the geometry image on an image according to the projection direction information; and
an encoding section configured to encode the image on which the geometry image is packed by the packing section to generate the encoded data, in which
the bit stream generation unit generates a bit stream that includes the projection direction information and the encoded data generated by the encoding section.

(8) An image processing method including:
generating a bit stream that includes projection direction information including information relating to a projection direction of position information of 3D data representative of a three-dimensional structure on a two-dimensional plane and encoded data of a geometry image obtained by projecting the position information on the two-dimensional plane.

(9) An image processing apparatus including:
a decoding section configured to decode, on the basis of projection direction information including information relating to a projection direction of position information of 3D data representative of a three-dimensional structure on a two-dimensional plane, a bit stream that includes encoded data of a geometry image obtained by projecting the position information on the two-dimensional plane.

(10) An image processing method including:
decoding, on the basis of projection direction information including information relating to a projection direction of position information of 3D data representative of a three-dimensional structure on a two-dimensional plane, a bit stream that includes encoded data of a geometry image obtained by projecting the position information on the two-dimensional plane.

(11) An image processing apparatus including:
a packing section configured to place and pack a geometry image that is obtained by projecting position information of 3D data representative of a three-dimensional structure on a two-dimensional plane, in an encoding unit of an image according to a projection direction of the position information on the two-dimensional plane.

(12) The image processing apparatus according to (11), in which
the packing section packs the geometry image on the basis of encoding unit information indicative of a correspondence between an identifier of the projection direction and information indicative of an encoding unit for placing the geometry image.

(13) The image processing apparatus according to (12), in which
the encoding unit information further includes attribute information relating to decoding.

(14) The image processing apparatus according to (13), in which
the attribute information includes meaning information indicative of a characteristic in the three-dimensional structure.

(15) The image processing apparatus according to (12), further including:
an encoding unit information generation unit configured to generate the encoding unit information, in which
the packing section packs the geometry image on the basis of the encoding unit information generated by the encoding unit information generation section.

(16) The image processing apparatus according to (12), further including:
an encoding section configured to encode the image on which the geometry image is packed by the packing section to generate encoded data; and
a bit stream generation section configured to generate a bit stream that includes the encoding unit information and the encoded data generated by the encoding section.

(17) The image processing apparatus according to (11), in which
the encoding unit includes a slice, a tile, or a picture.

(18) An image processing method including:
placing and packing a geometry image that is obtained by projecting position information of 3D data representative of a three-dimensional structure on a two-dimensional plane, in an encoding unit of an image according to a projection direction of the position information on the two-dimensional plane.

(19) An image processing apparatus including:
a decoding section configured to decode, from an encoding unit of a bit stream according to a projection direction of position information of 3D data representative of a three-dimensional structure on a two-dimensional plane, a geometry image projected on the two-dimensional plane in the projection direction.

(20) An image processing method including:
decoding, from an encoding unit of a bit stream according to a projection direction of position information of 3D data representative of a three-dimensional structure on a two-dimensional plane, a geometry image projected on the two-dimensional plane in the projection direction.

REFERENCE SIGNS LIST

100 Encoding apparatus, 111 Patch decomposition section, 112 Metadata generation section, 113 Packing section, 114 Auxiliary patch information compression section, 115 Video encoding section, 116 Video encoding section, 117 OMap encoding section, 118 Multiplexer, 151 Normal estimation section, 152 Segmentation initial setting section, 153 Segmentation updating section, 154 Projection direction setting section, 155 Two-dimensional projection section, 156 Index application section, 171 Projection direction information generation section, 172 Encoding unit information generation section, 200 Decoding apparatus, 211 Demultiplexer, 212 Metadata processing section, 213 Auxiliary patch information decoding section, 214 Video decoding section, 215 Video decoding section, 216 OMap decoding section, 217 Unpacking section, 218 3D re-construction section, 251 Inner product calculation section, 252 Decoding range setting section, 253 Decoding order setting section, 254 Decoding controlling unit

The invention claimed is:

1. An image processing apparatus comprising:
a bit stream generator configured to generate a bit stream that includes projection direction information including information relating to a projection direction of position information of 3D data representative of a three-dimensional structure on a two-dimensional plane and encoded data of a geometry image obtained by projecting the position information on the two-dimensional plane,
the projection direction information includes information relating to a correspondence of an identifier to a direction and a position at the time of projecting the position information on the two-dimensional plane,
the projection direction information further includes attribute information relating to decoding, and
the attribute information includes meaning information indicative of a characteristic in the three-dimensional structure.

2. The image processing apparatus according to claim 1, further comprising:
a projection direction information generator configured to generate the projection direction information, wherein
the bit stream generator generates a bit stream that includes the projection direction information generated by the projection direction information generator and the encoded data.

3. The image processing apparatus according to claim 1, further comprising:
a packer configured to place and pack the geometry image on an image according to the projection direction information; and
an encoder configured to encode the image on which the geometry image is packed by the packer to generate the encoded data, wherein
the bit stream generator generates a bit stream that includes the projection direction information and the encoded data generated by the encoder.

4. An image processing apparatus comprising:
a packer configured to place and pack a geometry image that is obtained by projecting position information of 3D data representative of a three-dimensional structure on a two-dimensional plane, in an encoder of an image according to a projection direction of the position information on the two-dimensional plane,
the packer packs the geometry image on a basis of encoder information indicative of a correspondence between an identifier of the projection direction and information indicative of an encoder for placing the geometry image,
the encoder information further includes attribute information relating to decoding, and
the attribute information includes meaning information indicative of a characteristic in the three-dimensional structure.

5. The image processing apparatus according to claim 4, further comprising:
an encoder information generator configured to generate the encoder information, wherein
the packer packs the geometry image on a basis of the encoder information generated by the encoder information generator.

6. The image processing apparatus according to claim 4, further comprising:
the encoder configured to encode the image on which the geometry image is packed by the packer to generate encoded data; and
a bit stream generator configured to generate a bit stream that includes the encoder information and the encoded data generated by the encoder.

7. The image processing apparatus according to claim 4, wherein the encoder includes a slice, a tile, or a picture.

8. An image processing apparatus comprising:
a decoder configured to decode, from an encoder of a bit stream according to a projection direction of position information of 3D data representative of a three-dimensional structure on a two-dimensional plane, a geometry image projected on the two-dimensional plane in the projection direction,
the projection direction information includes information relating to a correspondence of an identifier to a direction and a position at the time of projecting the position information on the two-dimensional plane,
the projection direction information further includes attribute information relating to decoding, and
the attribute information includes meaning information indicative of a characteristic in the three-dimensional structure.

9. An image processing method comprising:
decoding, from an encoder of a bit stream according to a projection direction of position information of 3D data representative of a three-dimensional structure on a two-dimensional plane, a geometry image projected on the two-dimensional plane in the projection direction,
the projection direction information includes information relating to a correspondence of an identifier to a direction and a position at the time of projecting the position information on the two-dimensional plane, the projection direction information further includes attribute information relating to decoding, and the attribute information includes meaning information indicative of a characteristic in the three-dimensional structure.

\* \* \* \* \*